(12) United States Patent
Thibaux et al.

(10) Patent No.: US 10,300,561 B2
(45) Date of Patent: May 28, 2019

(54) ELECTRIC ARC WELDING METHOD

(71) Applicant: ONDERZOEKSCENTRUM VOOR AANWENDING VAN STAAL N.V., Zelzate (BE)

(72) Inventors: Philippe Octave Thibaux, Zelzate (BE); Eric Rene Leontine Van Pottelberg, Zelzate (BE); Christopher Hendrikus Johannes Gerritsen, Zelzate (BE)

(73) Assignee: ONDERZOEKSCENTRUM VOOR AANWENDING VAN STAAL N.V., Zelzate (BE)

( * ) Notice: Subject to any disclaimer, the term of this patent is extended or adjusted under 35 U.S.C. 154(b) by 189 days.

(21) Appl. No.: 15/313,332

(22) PCT Filed: May 12, 2015

(86) PCT No.: PCT/EP2015/060463
§ 371 (c)(1),
(2) Date: Nov. 22, 2016

(87) PCT Pub. No.: WO2015/176998
PCT Pub. Date: Nov. 26, 2015

(65) Prior Publication Data
US 2017/0190003 A1     Jul. 6, 2017

(30) Foreign Application Priority Data
May 23, 2014   (NL) ...................................... 2012877

(51) Int. Cl.
*B23K 10/00*     (2006.01)
*B23K 33/00*     (2006.01)
(Continued)

(52) U.S. Cl.
CPC ............ *B23K 33/006* (2013.01); *B23K 9/025* (2013.01); *B23K 9/028* (2013.01); *B23K 9/127* (2013.01);
(Continued)

(58) Field of Classification Search
CPC ...... B23K 33/006; B23K 9/025; B23K 9/028; B23K 9/127; B23K 33/004; B23K 2201/06; H05H 1/26; H05H 1/42
(Continued)

(56) References Cited

U.S. PATENT DOCUMENTS 5,202,546 A     4/1993  Nakayama et al.
5,811,756 A  *  9/1998  Horita .................. B23K 9/0026
                                                   219/137 WM
(Continued)

FOREIGN PATENT DOCUMENTS

EP     1775391     4/2007
EP     2199003     6/2010

OTHER PUBLICATIONS

May 12, 2015—(WO) International Search Report—PCT/EP2015/060463.
(Continued)

*Primary Examiner* — Mark H Paschall
(74) *Attorney, Agent, or Firm* — Banner & Witcoff, Ltd.

(57) ABSTRACT

Features herein relate to an electric arc welding method for creating a multi-pass welded joint comprising the following steps:
a first stand-alone toe weld on a first construction element, then, arranging the first construction element and a second construction element in a joining position, with a distance being present between the first stand-alone toe weld and a root area of the welded joint to be created,
(Continued)

Figure 1:
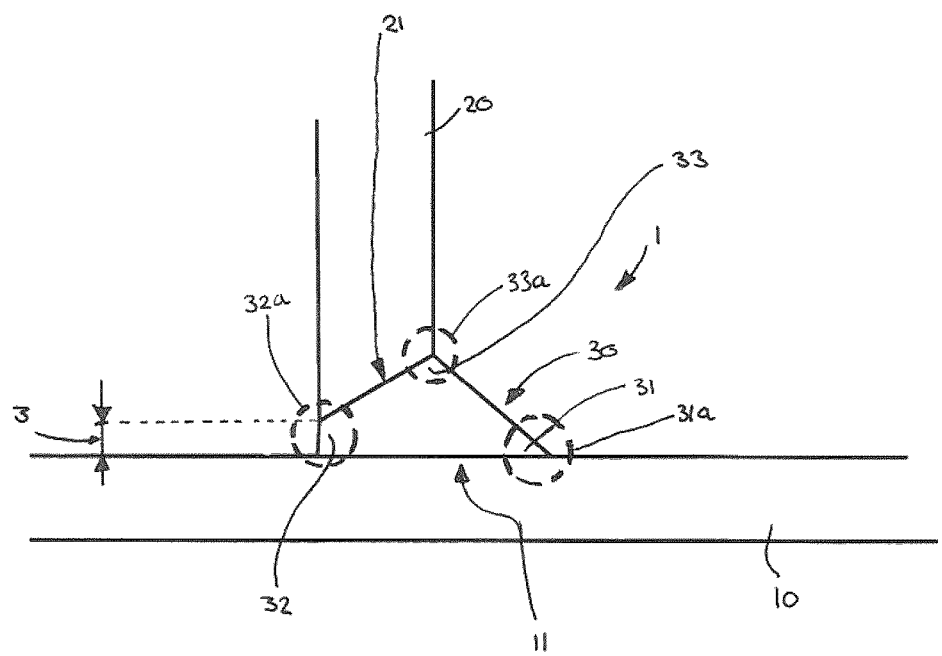

while maintaining the joining position, making a first weld connection between the first construction element and the second construction element by applying a root pass at the root area, then, applying one or more filling beads, wherein the first stand-alone toe weld, the root pass and the one or more filling beads together form part of the welded joint, wherein the first stand-alone toe weld forms the toe of said welded joint at the side of the first construction element.

16 Claims, 10 Drawing Sheets

(51) Int. Cl.
| | | |
|---|---|---|
| *B23K 9/025* | (2006.01) | |
| *B23K 9/028* | (2006.01) | |
| *B23K 9/127* | (2006.01) | |
| *B23K 101/06* | (2006.01) | |

(52) U.S. Cl.
CPC ........ *B23K 33/004* (2013.01); *B23K 2101/06* (2018.08)

(58) Field of Classification Search
USPC ...... 219/125, 125.1, 125.11, 121.45, 121.46, 219/137 R
See application file for complete search history.

(56) References Cited

U.S. PATENT DOCUMENTS

| | | | | |
|---|---|---|---|---|
| 6,649,870 | B1 * | 11/2003 | Barton | ................ B23K 9/0953 219/137 R |
| 8,357,876 | B1 * | 1/2013 | Allford | ................ B23K 9/0213 219/136 |
| 2001/0007331 | A1 | 7/2001 | Iwago et al. | |

OTHER PUBLICATIONS

Jan. 27, 2015—(NL) Search Report—App 2012877.
Jul. 8, 2016—(EP) International Preliminary Report on Patentability—PCT/EP2015/060463.
NEN-EN-ISO 6520-1:2007 "Welding and allied processes—Classification of geometric imperfections in metallic materials", p. 91 and excerpt section 505, 5051 and 5052 (Jul. 2007.).

* cited by examiner

ELECTRIC ARC WELDING METHOD

CROSS-REFERENCE TO RELATED APPLICATIONS

This application is a U.S. National Stage application under 35 U.S.C. § 371 of International Application PCT/EP2015/060463 (published as WO 2015/176998 A1), filed May 12, 2015, which claims priority to Application NL 2012877, filed May 23, 2014. Benefit of the filing date of each of these prior applications is hereby claimed. Each of these prior applications is hereby incorporated by reference in its entirety.

The invention pertains to an electric arc welding method for creating a multi-pass welded joint between a first metal construction element and a second metal construction element.

A multi-pass welded joint is a welded joint which is welded in multiple welding passes. Multiple welding beads make up the welded joint. With each welding pass, a welding bead is made.

In known methods for joining a first and a second construction element by a multi-pass weld, each construction element has a welding area, which is the part of the surface of the construction element where the weld will be made. This welding area is often prepared for the welding, for example by grinding or otherwise cleaning and/or smoothening the surface. After preparing the welding areas if necessary, the two construction elements are arranged in the joining position, which is the relative position they have when they are being connected to each other during the welding process. Generally the joining position will be the same as the relative position of the first construction element and the second construction element after the welding has been completed. Sometimes however, the joining position differs slightly from the final relative position of the first construction element and the second construction element after completion of the welding process, e.g. due to shrinkage or other deformations or weld zone distortions that occur due to the welding.

In the joining position, the welding areas of the two construction elements are arranged adjacent to each other. They may touch each other, but this is not necessary. In case the welding areas do not touch each other, they are separated by a welding gap.

The first actual welding that takes place in known methods for joining two construction elements by multi-pass welding is to apply a root pass that connects the two construction elements to each other. This root pass is made in the root area of the welded joint that is to be created.

In known methods, the root pass is the first permanent welding pass that is made in the entire multi-pass weld. The "root of the weld" is a well known term in the art of welding. The root area is the part of the weld comprising the root and the direct vicinity thereof. In practice, the root area is the area in which the welding pass is made with the electrode of the welding torch positioned the deepest in the welding seam. In case of a generally V-shaped welding seam, the root area is located the tip of the V (where the two legs of the V meet each other or are the closest to each other) and the direct vicinity thereof. In case of an X-shaped welding seam, wherein the weld is made from both sides, the root area is located in the center of the X (where the legs of the X cross each other or are closest to each other) and the direct vicinity thereof. In case of a generally U-shaped welding seam, the root area is located at the bottom of the U-shape and the direct vicinity thereof.

In known methods for joining a first and second construction element by multi-pass welding, the root pass is the first actual welding pass that is carried out when constructing the multi-pass weld. The root pass is sometimes preceded by one or more tack welds, but these dissolve in the actual root pass when the root pass is made or are removed for example by grinding or machining before the root pass is made at the position of said tack weld. The root pass can be either a single root pass over the entire length of the welding seam or it can be made up of a plurality of shorter weld passes. After applying the root pass, the multi-pass weld is filled up by the application of further weld beads, until the desired volume and shape of the weld are obtained.

Generally, in the known methods, the weld is filled from the root pass outwardly, increasing the weld volume as the welding goes on.

Multi-pass welds that are made using known methods can be susceptible to fatigue cracking. Such fatigue cracking often occurs first in a region near the toe of the weld.

Several methods are known from the art in order to increase the resistance against fatigue cracking of welds. For example it is known to induce compression stresses at the surface of the weld—e.g. by shot peening or hammering—after the welding has been completed. These compression stresses serve to delay or even prevent the formation of fatigue cracks.

Another approach is to make sure the weld geometry introduces as few stress concentrations as possible. When using this approach, the weld surface is made as smooth as possible. The smooth shape can be obtained by the welding process itself, but in practice this is often hard to achieve. A known way of obtaining an advantageous geometry is for example by applying an additional, smooth weld pass between the toe area of the weld and the base material of the construction element at which the weld toe is present. This is however not used often because it requires a very skilled welder to produce such a weld. In general, often the welded joint is ground after the welding in order to remove local geometric flaws that would otherwise induce stress concentrations.

These known approaches to improving the resistance of welds against fatigue cracking are generally impractical and/or labour intensive.

US 2001/0007331 discloses a method for making a fillet weld. The actual fillet weld that forms the connection between two construction elements (i.e. the connecting weld) is made from one side. This method is typically applied when the only one side of the weld is accessible to the welder. Before making this connecting weld, an overlay weld is made on one construction element, on the side of the construction element opposite to the side from which the connecting weld is made. This is done by arranging the overlay weld on said construction element and against a block of a material that does not melt under the influence of the welding arc. This material is removed after the overlay weld is solidified, after which the overlay weld is machined. Then the construction elements to be joined are positioned relative to each other and the connection weld is made. The overlay weld will generally not over its entire surface area be joined with the construction element which it was not initially arranged upon. So, after joining the two construction elements by the connecting weld, a slit remains between the overlay weld and the construction element that is joined to the construction element with the overlay weld. The slit is present at or close to the root area of the connecting weld.

The overlay weld as taught by US 2001/0007331 is made in order to increase the plate thickness and plate width of the construction element.

U.S. Pat. No. 5,202,546 also discloses a method for making a fillet weld. Also in this method, the fillet weld is made from one side. This method is typically applied when the only one side of the weld is accessible to the welder. In the method of U.S. Pat. No. 5,202,546, a "dike bead" is made on one construction element prior to making the root pass of the actual fillet weld. This dike bead is located behind the root pass when looked at the weld from the position of the welder. The root pass is laid against the dike bead, so that molten material does not flow out of weld area via the weld opening between the two construction elements that are to be joined. The dike bead prevents a burning through of the root pass bead.

EP2199003 also discloses a method for making a fillet weld. Also in this method, the fillet weld is made from one side. This method is typically applied when the only one side of the weld is accessible to the welder. In the method of EP2199003, the elements to be joined by the weld are positioned relative to each other before the first welding bead is formed. The first welding bead that is formed is a penetration bead that is made behind the root area of the fillet weld, as seen from the position of the welder. To this end, the welding wire is positioned deep into the prepared welding groove. Directly after the penetration bead is formed, the root pass that connects the two construction elements for the first time is made adjacent to the penetration bead. No re-positioning of the construction elements relative to each other takes place between the formation of the penetration bead and the formation of the root pass.

It is the object of the invention to provide an improved method for creating a multi-pass weld.

This object is achieved by an electric arc welding method for creating a multi-pass welded joint between a first metal construction element and a second metal construction element, which welding method comprises the following steps:
  providing a first metal construction element which has a welding area, and applying a first stand-alone toe weld on said first construction element, which first stand-alone toe weld comprises at least one first stand-alone toe weld bead,
  providing a second metal construction element which has a welding area,
  after applying the first stand-alone toe weld on the first construction element, arranging the first construction element and the second construction element relative to each other in a joining position, in which joining position a distance is present seen along the welding area of the first construction element, between the first stand-alone toe weld and a root area of the welded joint to be created,
  while maintaining the joining position, making a first weld connection between the welding area of the first construction element and the welding area of the second construction element by applying a root pass at the root area of the welded joint to be created, which root pass comprises at least one root pass bead,
  after applying the root pass, applying one or more filling beads, wherein the first stand-alone toe weld, the root pass and the one or more filling beads together form part of the multi-pass welded joint between the first construction element and the second construction element, wherein the first stand-alone toe weld forms the toe of said welded joint at the side of the first construction element.

As the first stand-alone toe weld forms the toe of said welded joint at the side of the first construction element, the filling beads do not extend beyond the first stand-alone toe weld on the surface of the first construction element at the side of the first stand-alone toe weld away from the root area of the multi-pass welded joint.

In general, at least some of the filling beads are arranged between the root pass and the first stand-alone toe weld.

In general, the first stand-alone toe weld is closer to the position of the welder than the root area of the weld during the formation the root pass and during the formation of the filling beads. The tip of the welding torch has to pass the first stand-alone toe weld when the root pass is formed.

In accordance with the method according to the invention, a first stand-alone toe weld is applied on the first construction element as part of the preparation for creating the multi-pass welded joint. This toe weld is designated as "stand-alone" as it is only connected to the first construction element when it is made. So, initially, this first stand-alone toe weld does not connect two construction elements with each other. Only later on in the method according to the invention, it becomes part of the multi-pass welded joint that connects the first and the second construction element with each other.

The first stand-alone toe weld is applied on the first construction element before the first and second construction element are arranged relative to each other in the joining position, which is the relative position they have when they are being connected to each other during the welding. Sometimes, the joining position differs slightly from the final relative position of the first construction element and the second construction element after completion of the welding process, e.g. due to shrinkage or other deformations that occur due to the welding.

Providing the first stand-alone toe weld before arranging the first construction element and second construction element in the joining position has significant benefits, even compared to a situation in which a welding bead in the toe area is applied right after the root pass has been made and before most of the filling beads are made.

Tests have shown an indication that the fatigue resistance of the multi-pass weld increases when the welding bead or welding beads in the toe region of the weld are of good quality, e.g. in terms of geometry (e.g. absence of defects), and/or properties like limited undesired residual stresses. Applying the toe weld bead or toe weld beads in the form of a stand-alone toe weld prior to arranging the first and second construction element in the joining position offers various possibilities to improve the quality of the welding bead or beads in the toe region of the weld.

For example, the method according to the invention makes it possible to apply the first stand-alone toe weld on the first construction element before transporting the first construction element to the location where it is connected to the second construction element. This allows for example the first stand-alone toe weld to be applied to the first construction element in a rather controlled environment of for example a factory or a workshop, e.g. at the premises of the manufacturer of the first construction element, rather than that the toe weld has to be made at an outdoor yard where a structure comprising the first and second construction element is welded together, as is common for e.g. the manufacturing of jackets for offshore constructions such as offshore drilling rigs or offshore wind turbines. The first construction element with the first stand-alone toe weld can for example be delivered as an intermediate product to a manufacturer of steel structures. In that case, or in general when the first stand-alone toe weld is applied on the first construction element at a different location, in particular at a different production location, than where the first and second construction element are connected to each other, advantageously the first stand-alone toe weld is provided with a protective cover that protects the first stand-alone toe weld from damage during storage and/or transport.

In a possible embodiment of the invention, the first stand-alone toe weld is made by an automated process, e.g. by using a welding robot. As the second construction element will generally not be near the first construction element when the first stand-alone toe weld is made, the machine making the first stand-alone toe weld is not obstructed in its movements by the second construction element or by any struts, cables, cranes or supports that hold the first and/or second construction element in the joining position. It also allows the first construction element to be moved during the application of the first stand-alone toe weld as the first construction element does not have to be kept in the joining position relative to the second construction element during the application of the first stand-alone toe weld. This provides more flexibility in applying the first stand-alone toe weld, allowing optimization of the welding process e.g. in terms of welding position and/or welding speed. This helps to obtain a good quality, good properties and good geometry of the first stand-alone toe weld.

In an alternative embodiment, the first stand-alone toe weld is made manually. This is also facilitated by the method according to the invention as the person making the first stand-alone toe weld is not obstructed in his movements by the second construction element or by any struts, cables, cranes or supports that hold the first and/or second construction element in the joining position.

In a possible embodiment of the invention, the first stand-alone toe weld is applied in a downhand position, that is with the welding torch above the weld and a generally horizontal relative movement of the welding torch and the first construction element. It has been found that using this welding position for the first stand-alone toe weld has an advantageous effect on the fatigue resistance of the multi-pass welded joint. In this embodiment, it is possible that the welding torch moves and the first construction element is kept stationary, or that the welding torch is kept stationary and the first construction element is moved, or that both the welding torch and the first construction element move during the application of the first stand-alone toe weld.

In a possible embodiment, the first metal construction element and the second metal construction element are connected to each other by the multi-pass weld at a relative angle with each other. The relative angle between the first and second construction element in this embodiment can be any angle other than 0° or 180°. This means that in this case, the first and second construction element are not co-axial with each other.

In a possible embodiment, the multi-pass weld that is made in accordance with the invention is a fillet weld or a butt weld.

In a possible embodiment, the multi-pass weld that is made in accordance with the invention is a full penetration weld. This means that the multi-pass weld extends through the entire wall thickness of the first construction element and second construction element. The use of a full penetration weld is advantageous in structures that are subjected to varying (or even alternating) mechanical loads, as full penetration welds can have good resistance against fatigue cracking. They often show lower levels of mechanical stress than other weld types and can be made in such a way that they do not have internal notches.

In a possible embodiment, the multi-pass weld has a weld seam shape that is one from the group of: V-groove weld, K-groove weld, X-groove weld, U-groove weld, semi-V-groove weld, Y-groove weld.

In a possible embodiment, at least one of the first or second construction element is a cylindrical construction element, e.g. a cylindrical tube.

In a possible embodiment, both the first and the second construction elements are cylindrical construction elements, e.g. cylindrical tubes.

In a possible embodiment, the first and second construction element form—after welding them together—part of a steel structure, for example a jacket for an offshore wind turbine, an offshore drilling rig, a power pylon, a bridge.

In a possible embodiment, the first construction element is provided with a plurality of first stand-alone toe welds.

In a possible embodiment, the second construction element is provided with a plurality of second stand-alone toe welds.

In case the first construction element is a cylindrical construction element, optionally the cylindrical first construction element is rotated about its longitudinal axis during the application of the first stand-alone toe weld. This is in particular advantageous when the first stand-alone toe weld is applied to the curved outer wall of the cylindrical first construction element as this allows the first stand-alone toe weld to be applied using a downhand welding position over the entire length of the first stand-alone toe weld, despite the curved shape of the surface onto which it is applied. Furthermore, this set-up makes it easier to apply a toe weld bead that forms a closed loop in one welding pass. So, there is only one start/stop point along the length of the closed loop shaped toe weld bead. This is advantageous, as geometrical deficiencies often occur at start/stop points of the weld beads. Furthermore, if there is just one start/stop point or just a limited number of start/stop points, the start/stop point or start/stop points can be arranged in a less critical area of the weld.

In a possible embodiment, the first stand-alone toe weld comprises multiple first toe weld beads. For example, the first stand-alone toe weld is made up out of two, three or five toe weld beads. This is advantageous, among others because it allows to create a smoother shape of the entire multi-pass welded joint and because the heat input of the multiple toe weld passes provides some stress relieve annealing for the toe weld passes. Furthermore, as the method according to the invention facilitates the application of the first stand-alone toe weld by an automated process and/or under controlled circumstances, having a first stand-alone toe weld made up out of a plurality of first toe weld beads makes that a larger proportion of the entire multi-pass weld is made by an automated process and/or under controlled circumstances. This helps to increase the overall quality of the weld, for example in terms of geometry and/or in terms of the mechanical and/or physical properties of the weld (e.g porosity, residual stress).

In a possible embodiment, at least one first stand-alone toe weld bead is applied by a welding process that has a heat input of less than 2.5 kJ/mm, preferably less than 1.5 kJ/mm. Using little heat input results in relatively low residual stresses in and near the welding bead, and in a relatively small heat affected zone. As the method according to the invention allows the stand-alone toe weld to be made under controlled circumstances, it is often feasible to use a welding process with a low heat input.

In a possible embodiment, at least a part of the welding area of the first construction element is ground prior to the application of the root pass. Optionally, at least a part of the welding area of the first construction element is ground after the application of the first stand-alone toe weld. As the first stand-alone toe weld is applied before the first and second construction element are arranged in the joining position, the welding area of the first construction element is easily accessible even after the first stand-alone toe weld has been applied. Furthermore, as the second construction element is not yet positioned close to the first construction element and/or attached to the first construction element, the first construction element can still be handled, transported, moved and/or positioned relatively easily.

In a possible embodiment, the first stand-alone toe weld is subjected to a treatment, either before or after the root pass is applied, for example a treatment that is aimed at improving the geometry and/or residual stress state of and/or near the first stand-alone toe weld. This treatment can for example comprise shot peening, hammering, grinding, a thermal treatment (e.g. stress relief annealing). These treatments all increase the quality, for example in terms of geometry and/or in terms of the mechanical and/of physical properties of the weld (e.g level of undesired residual stress), of the first stand-alone toe weld. As the quality of the first stand-alone toe weld increases, this has a positive effect on the fatigue resistance of the entire multi-pass welded joint.

It can be advantageous to carry out the treatment of the first stand-alone toe weld before applying the root pass, as the first stand-alone toe weld is applied before the first and second construction element are arranged in the joining position, and then the first stand-alone toe weld on the first construction element is easily accessible. Furthermore, the first construction element can be handled, transported, moved and positioned relatively easily for those treatments as the second construction element is not yet positioned close to the first construction element and/or attached to the first construction element.

In a possible embodiment, the height of the first stand-alone toe weld (as measured from the welding area of the first construction element adjacent to first stand-alone toe weld) is related to the local wall thickness of the first construction element in the vicinity of the first stand-alone toe weld. For example, the first stand-alone toe weld has a height relative to the welding area of the first construction element, which height is between 5% and 25% of the wall thickness of the first construction element, optionally between 10% and 20% of the wall thickness of the first construction element. This height is to be determined after welding the entire multi-pass welded joint. The height of the first stand-alone toe weld is the distance from the surface of the first construction element to the point (or line) on the outer surface of the multi-pass weld where the first stand-alone toe weld meets the adjacent filling bead. In practice, this height will generally be less then the height over which the first stand-alone toe weld protrudes from the surface of the first construction element before the filling beads are applied, as usually the application of the filling beads adjacent to the first stand-alone toe weld will cause some melting of the first stand-alone toe weld.

In a possible embodiment, the distance between the first stand-alone toe weld and the root area of the welded joint, measured from the root area of the welded joint to the center of the first stand-alone toe weld, is between 1 and 2.5 times the local wall thickness of the second construction element in the vicinity of the welded joint, preferably between 1.3 and 1.7 times the local wall thickness of the second construction element in the vicinity of the welded joint.

In a possible embodiment the method according to the invention is specifically adapted to create multi-pass welded joint between two cylindrical, e.g. tubular, construction elements. This particular embodiment involves an electric arc welding method for creating a multi-pass fillet welded joint between a first metal cylindrical construction element and a second metal cylindrical construction element, which first construction element and second construction element are to be connected to each other in a joining position, in which joining position the first construction element and the second construction element extend at an angle relative to each other, which welding method comprises the following steps:

providing a first metal cylindrical construction element which has a longitudinal axis, an outer wall and on said outer wall a welding area, and applying a first stand-alone toe weld on the outer wall of said first construction element, which first stand-alone toe weld comprises at least one first toe weld bead, which first stand-alone toe weld has the shape of a projected image of a circle having a circle diameter, which image is projected on the outer wall of the first construction element at an angle that is the same as the relative angle between the first construction element and the second construction element in a joining position, providing a second metal cylindrical construction element which has a longitudinal axis, an outer wall and a welding area, which second construction element has an outer diameter that is smaller than said circle diameter, after applying the first stand-alone toe weld on the first construction element, arranging the first construction element and the second construction element relative to each other in said joining position wherein the first construction element and the second construction element are at an angle relative to each another, in which joining position a distance is present seen along the welding area of the first construction element, between the first stand-alone toe weld and a root area of the welded joint to be created, and in which joining position the second construction element is arranged within the perimeter of the first stand-alone toe weld, while maintaining the joining position, making a first weld connection between the welding area of the first construction element and the welding area of the second construction element by applying a root pass at the root area of the welded joint to be created, which root pass comprises at least one root pass bead, after applying the root pass, applying one or more filling beads, wherein the first stand-alone toe weld, the root pass and the one or more filling beads together form part of the welded joint between the first construction element and the second construction element, wherein the first stand-alone toe weld forms the toe of said welded joint at the side of the first construction element.

The first construction element and the second construction element extending at an angle relative to each other in the above embodiment means that this relative angle is other than 0° or 180°.

Optionally, in this specific embodiment the first stand-alone toe weld is applied in a downhand position, and the first construction element is rotated around its longitudinal axis during the application of the first stand-alone toe weld.

The shape of the first stand-alone toe weld may depend on the shape of the outer wall of the first construction element. For example, if the outer wall of the first construction element onto which the first stand-alone toe weld is to be applied would have a flat, planar shape, and a tubular second construction element is to be connected to the first construction element under an angle of 90°, then the first stand-alone toe weld has the shape of a circle with a diameter that is the same as the diameter of the circle of which the image is projected onto the outer wall of the first construction element. However, if the first construction element is tubular, like in the embodiment described above, and/or the tubular second construction element extends at a relative angle other than 0° or 90° from the first construction element (like in the embodiment described above), the shape of the first stand-alone toe weld is generally elliptical.

So far, details of the first stand-alone toe weld have been described. However, in all embodiments described above, optionally in addition the second construction element is provided with a stand-alone toe weld, which stand-alone toe weld is called "second stand-alone toe weld" to distinguish it from the "first stand-alone toe weld" that is present on the first construction element. It is possible that the second stand-alone toe weld is applied on the second construction element before, at the same time or after the first stand-alone toe weld is applied on the first construction element. The second stand-alone toe weld comprises at least one second toe weld bead.

Similar to the first stand-alone toe weld, the second stand-alone toe weld is only connected to the second construction element when it is made. So, initially, this second stand-alone toe weld does not connect two construction elements with each other. Only later on in the method according to the invention, it becomes part of the multi-pass welded joint that connects the first and the second construction element with each other.

The second stand-alone toe weld is applied onto the second construction element before the first and second construction element are arranged relative to each other in the joining position, which is the relative position of the first and second construction element in which they are being connected to each other during the welding process. Sometimes, the joining position differs slightly from the final relative position of the first construction element and the second construction element after completion of the welding process, e.g. due to shrinkage or other deformations that occur due to the welding.

In general, at least some of the filling beads are arranged between the root pass and the second stand-alone toe weld.

In general, the second stand-alone toe weld is closer to the position of the welder than the root area of the weld during the formation the root pass and during the formation of the filling beads. The tip of the welding torch has to pass the second stand-alone toe weld when the root pass is formed.

Similar to the first stand-alone toe weld, the second stand-alone toe weld can be made at a different location, in particular at a different production location, than where the first and second construction element are joined together by the root pass. This allows for example the second stand-alone toe weld to be applied on the second construction element in a rather controlled environment of for example a factory or a workshop, e.g. at the premises of the manufacturer of the second construction element, rather than that the toe weld has to be made at an outdoor yard where a structure comprising the first and second construction element is welded together.

Preferably, also the second stand-alone toe weld is provided with a protective cover during transport and/or storage.

Optionally, the second stand-alone toe weld is made by an automated process, e.g. by using a welding robot. As the first construction element will generally not be near the second construction element when the second stand-alone toe weld is made, the machine making the second stand-alone toe weld is not obstructed in its movements by the first construction element or by any struts, cables, cranes or supports that hold the first and/or second construction element in the joining position. It also allows the second construction element to be moved during the application of the second stand-alone toe weld as the second construction element does not have to be kept in the joining position relative to the first construction element during the application of the second stand-alone toe weld. This provides more flexibility in applying the second stand-alone toe weld, allowing optimization of the welding process e.g. in terms of welding position and/or welding speed. This helps to obtain a good quality of the second stand-alone toe weld.

In an alternative embodiment, the second stand-alone toe weld is made manually.

In a possible embodiment of the invention, similar to the first stand-alone toe weld, the second stand-alone toe weld is applied in a downhand position, that is with the welding torch above the weld and a generally horizontal relative movement of the welding torch and the second construction element. It has been found that using this welding position for the second stand-alone toe weld has an advantageous effect on the fatigue resistance of the multi-pass welded joint. In this embodiment, it is possible that the welding torch moves and the second construction element is kept stationary, or that the welding torch is kept stationary and the second construction element is moved, or that both the welding torch and the second construction element move during the application of the second stand-alone toe weld.

In case the second construction element is a cylindrical construction element and this second construction element is to be provided with a second stand-alone toe weld, optionally the cylindrical second construction element is rotated about its longitudinal axis during the application of the second stand-alone toe weld. This is in particular advantageous when the second stand-alone toe weld is applied to the curved outer wall of the cylindrical second construction element as this allows the second stand-alone toe weld to be applied using a downhand welding position over the entire length of the second stand-alone toe weld, despite the curved shape of the surface onto which it is applied. Furthermore, this set-up makes it easier to apply a toe weld bead that forms a closed loop in one welding pass.

In a possible embodiment, the second stand-alone toe weld comprises multiple second toe weld beads. For example, the second stand-alone toe weld is made up out of two, three or five toe weld beads. This has advantages that are similar to those for a first stand-alone toe weld that is made up out of multiple first toe weld beads.

Similar to the first stand-alone toe weld beads, optionally at least one second stand-alone toe weld bead is applied by a welding process that has a heat input of less than 2.5 kJ/mm, preferably less than 1.5 kJ/mm. Using low heat input results in relatively low residual stresses in and near the welding bead, and in a relatively small heat affected zone.

In a possible embodiment, the welding area of the second construction element is ground prior to the application of the root pass. Optionally, the welding area of the second construction element is ground after the application of the second stand-alone toe weld.

In a possible embodiment, second stand-alone toe weld is subjected to a treatment, either before or after the root pass is applied, for example to a treatment that is aimed at improving the geometry and/or residual stress state of and/or near the second stand-alone toe weld. This treatment can for example comprise shot peening, hammering, grinding, a thermal treatment (e.g. stress relief annealing). These treatments all increase the quality, for example in terms of geometry and/or in terms of the mechanical and/of physical properties of the weld (e.g the level of undesired residual stress), of the second stand-alone toe weld. As the quality of the second stand-alone toe weld increases, this has a positive effect on the fatigue resistance of the entire multi-pass welded joint.

In a possible embodiment, the height of the second stand-alone toe weld (as measured from the welding area of the second construction element adjacent to second stand-alone toe weld) is related to the local wall thickness of the second construction element in the vicinity of the second stand-alone toe weld. For example, the second stand-alone toe weld has a height relative to the welding area of the second construction element, which height is between 5% and 25% of the wall thickness of the second construction element, optionally between 10% and 20% of the wall thickness of the second construction element. This height is to be determined after welding the entire multi-pass welded joint. The height of the second stand-alone toe weld is the distance from the surface of the second construction element to the point (or line) on the outer surface of the multi-pass weld where the second stand-alone toe weld meets the adjacent filling bead. In practice, this height will generally be less then the height over which the second stand-alone toe weld protrudes from the surface of the first construction element before the filling beads are applied, as usually the application of the filling beads adjacent to the second stand-alone toe weld will cause some melting of the second stand-alone toe weld.

In a possible embodiment, the distance between the second stand-alone toe weld and the root area of the welded joint, measured from the root area of the welded joint to the center of the second stand-alone toe weld is between 1 and 2.5 times the local wall thickness of the second construction element in the vicinity of the welded joint, preferably between 1.3 and 1.7 times the local wall thickness of the second construction element in the vicinity of the welded joint.

Also in the embodiment of the method according to the invention which is specifically adapted to create multi-pass welded joint between two cylindrical, e.g. tubular, construction elements as described earlier, optionally a second stand-alone toe weld is applied on the second construction element.

In a possible embodiment, the first construction element is provided at a first production site, and the first stand-alone toe weld is applied on the first construction element at this first production site. Furthermore, the root pass is made at a second production site which can be different from the first production site. In this embodiment, the method further comprises the step of transporting the first construction element with the first stand-alone toe weld thereon from the first production site to the second production site. Preferably, the first stand-alone toe weld, optionally the first stand-alone toe weld and the welding area both, is provided with a protective cover to protect the stand-alone toe weld during transport and/or storage.

In some situations, not just the toe but also the root of the weld is susceptible to fatigue cracking. In some practical cases, the root of the weld may even be more susceptible to fatigue cracking than the toe of the weld. This can for example be the case when the root area of the weld is hard to reach with the electrode of the welding torch, so that penetration faults or bonding faults may occur in the root area of the weld. Also, the presence of in particular tensile stresses in the first and/or second construction element in or near the root area of the welded joint during use of the welded structure containing the first and second construction element may contribute to the root area of the welded joint being susceptible to fatigue cracking.

In a variant of the current invention, the inventive concept as described above can also be used in order to mitigate these problems. In this variant, a stand-alone base weld is applied instead of or in addition to the first stand-alone toe weld. Like the first stand-alone toe weld and the optional second stand-alone toe weld, the stand-alone base weld is only connected to the first construction element or the second construction element when it is made. So, initially, this stand-alone base weld does not connect two construction elements with each other. Only later on in the method according to the invention, it becomes part of the multi-pass welded joint that connects the first and the second construction element with each other.

In this variant, the invention pertains to an electric arc welding method for creating a multi-pass welded joint between a first metal construction element and a second metal construction element, which welding method comprises the following steps:

providing a first metal construction element which has a welding area, and applying a stand-alone base weld on said first construction element, which stand-alone base weld comprises at least one stand-alone base weld bead, providing a second metal construction element which has a welding area, after applying the first stand-alone base weld on the first construction element, arranging the first construction element and the second construction element relative to each other in a joining position, in which joining position the stand-alone base weld is arranged in a root area of the welded joint to be created, while maintaining the joining position, making a first weld connection between the welding area of the first construction element and the welding area of the second construction element by applying a root pass at the root area of the welded joint to be created, which root pass comprises at least one root pass bead, after applying the root pass, applying one or more filling beads, wherein the stand-alone base weld, the root pass and the one or more filling beads together form part of the welded joint between the first construction element and the second construction element, wherein the stand-alone base weld forms part of the root of said welded joint.

In a possible embodiment, the first construction element is provided with a stand-alone base weld and one or more first stand-alone toe welds.

In a possible embodiment, the second construction element is provided with a stand-alone base weld and one or more second stand-alone toe welds.

In a possible embodiment, the first construction element is provided with one or more first stand-alone toe welds, the second construction element is provided with one or more second stand-alone toe welds, and the first construction element and/or the second construction element is provided with a stand-alone base weld.

In a possible embodiment, the stand-alone base weld is applied in a downhand position.

In a possible embodiment, the stand-alone base weld is applied by an automated welding process.

In a possible embodiment, the stand-alone base weld comprises multiple base weld beads.

In a possible embodiment, a stand-alone base weld bead is applied by a welding process that has a heat input of less than 2.5 kJ/mm, preferably less than 1.5 kJ/mm.

In a possible embodiment, the welding area of the first construction element and/or the welding area of the second construction element is ground after the application of the stand-alone base weld.

In a possible embodiment, the stand-alone base weld is subjected to a treatment aimed at improving the geometry and/or residual stress state of and/or near stand-alone base weld, e.g. shot peening, hammering, thermal treatment, grinding, before the root pass is applied.

In a possible embodiment, the stand-alone base weld has a height relative to the welding area of the first construction element, which height is between 5% and 25% of the local wall thickness of the first construction element in the vicinity of the stand-alone base weld, preferably between 10% and 20% of the local wall thickness of the first construction element in the vicinity of the stand-alone base weld. This height is to be determined after welding the entire multi-pass welded joint. The height of the stand-alone base weld is the distance from the surface of the first construction element to the point (or line) on the outer surface of the multi-pass weld where the stand-alone base weld meets its adjacent welding bead, which is either (part of) the root pass or a filling bead. In practice, this height will generally be less then the height over which the stand-alone base weld protrudes from the surface of the first construction element before the root pass and the filling beads are applied, as usually the application of the root pass and/or the filling beads adjacent to the stand-alone base weld will cause some melting of the stand-alone base weld.

In a possible embodiment, a protective cover is provided over the stand-alone base weld, with protective cover optionally also covers any first and/or second stand-alone toe welds that are provided on the construction element to which the stand-alone base weld is applied.

The invention further pertains to a metal welded structure, produced by a method according to the invention.

Optionally, in such a metal welded structure the first construction element and the second construction element are cylindrical tubes, wherein at least one first toe weld bead has the form of a continuous closed loop.

The invention further pertains to a metal construction element, which construction element is provided with a stand-alone toe weld and/or stand-alone base weld in accordance with the method according to the invention, which stand-alone toe weld and/or stand-alone base weld is optionally provided with a protective cover. Such a metal construction element could be used as a first or second construction element in the method according to the invention.

Optionally, such a metal construction element is a cylindrical tube, which cylindrical tube has an outer wall which extends in the axial direction of the cylindrical tube, on which outer wall the first stand-alone toe weld is arranged, which first stand-alone toe weld has the shape of an image of a circle that is projected on said outer wall.

The invention further pertains to a combination of a first metal cylindrical construction element and a second metal cylindrical construction element, wherein the first cylindrical construction element has an outer wall which extends in the axial direction of the cylindrical construction element, on which outer wall a first stand-alone toe weld is arranged, which first stand-alone toe weld has the shape of a projected image of circle having a circle diameter, which image is projected on the outer wall of the first construction element at an angle that is the same as the relative angle between the first construction element and the second construction element in a joining position, and wherein the second metal cylindrical construction element has an outer diameter that is smaller than said circle diameter.

The invention will be described in more detail below under reference to the drawing, in which in a non-limiting manner exemplary embodiments of the invention will be shown.

Figure 2:
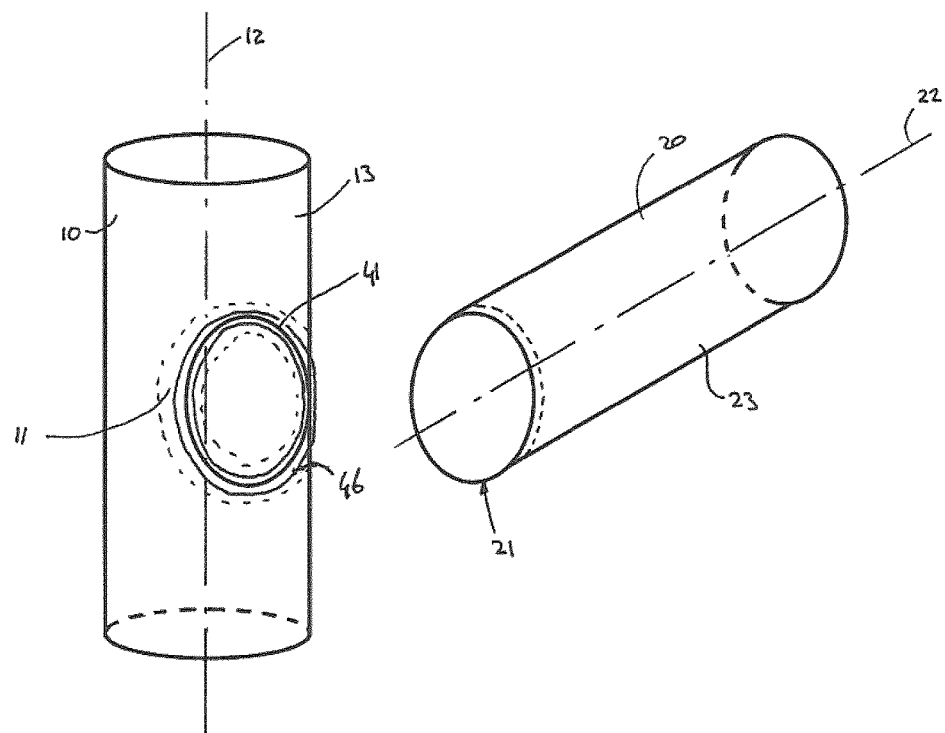
Figure 3:
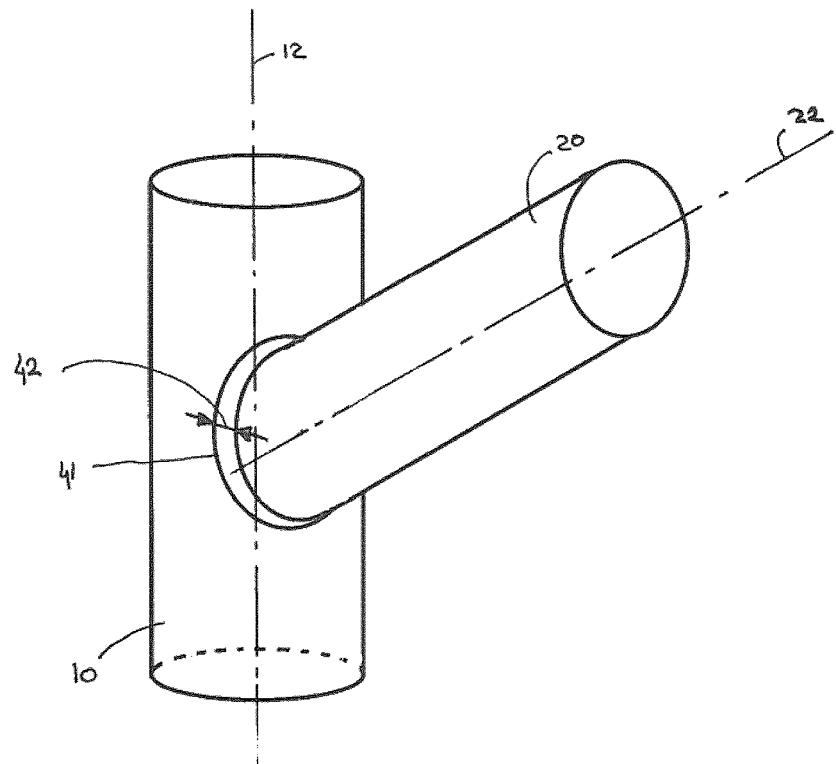
Figure 4:
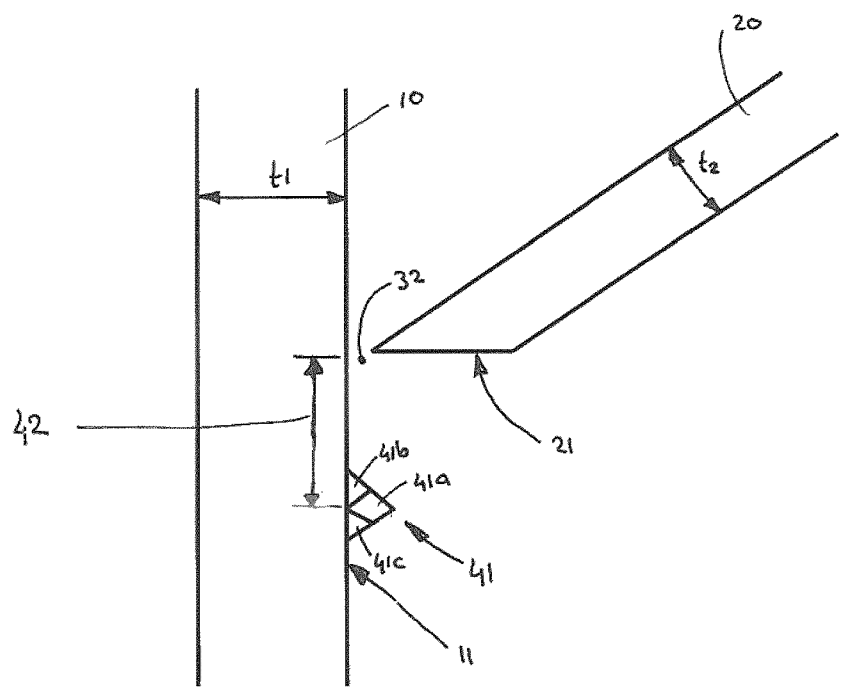
Figure 5:
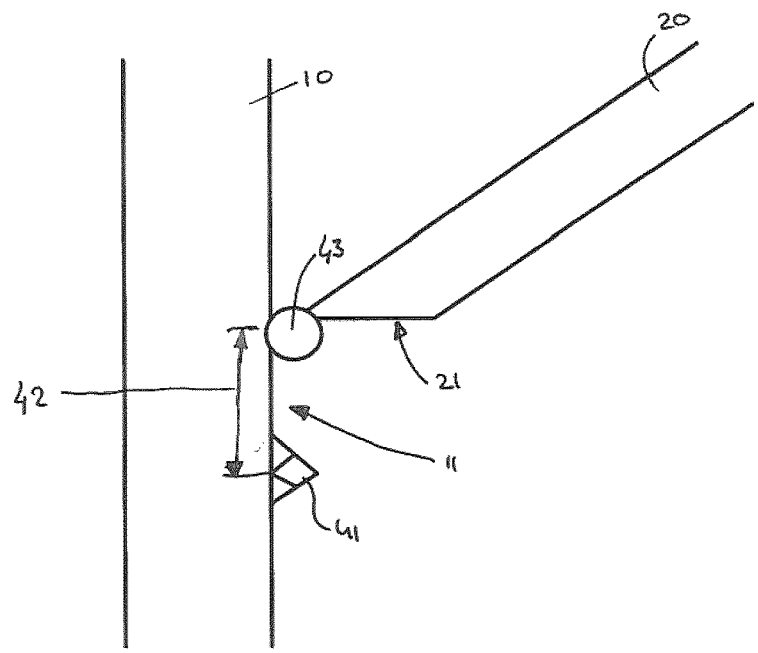
Figure 6:
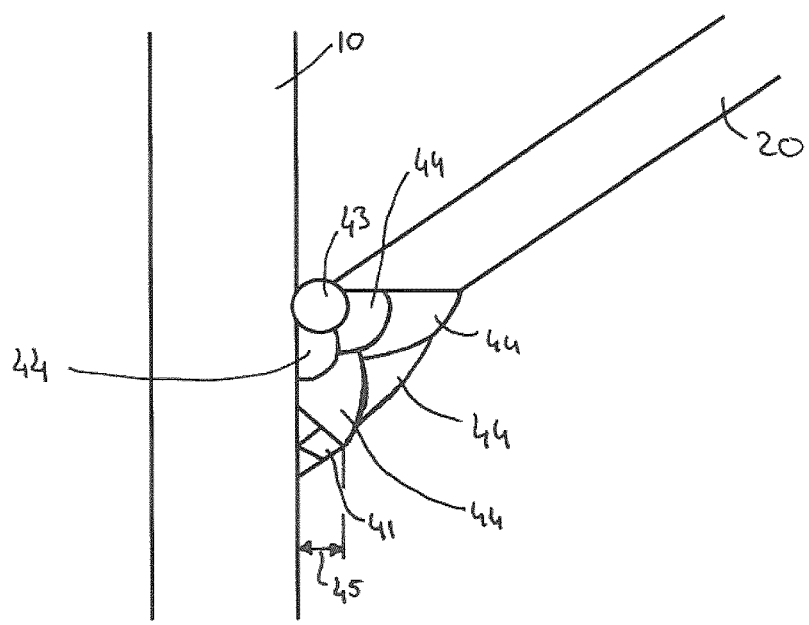
Figure 7:
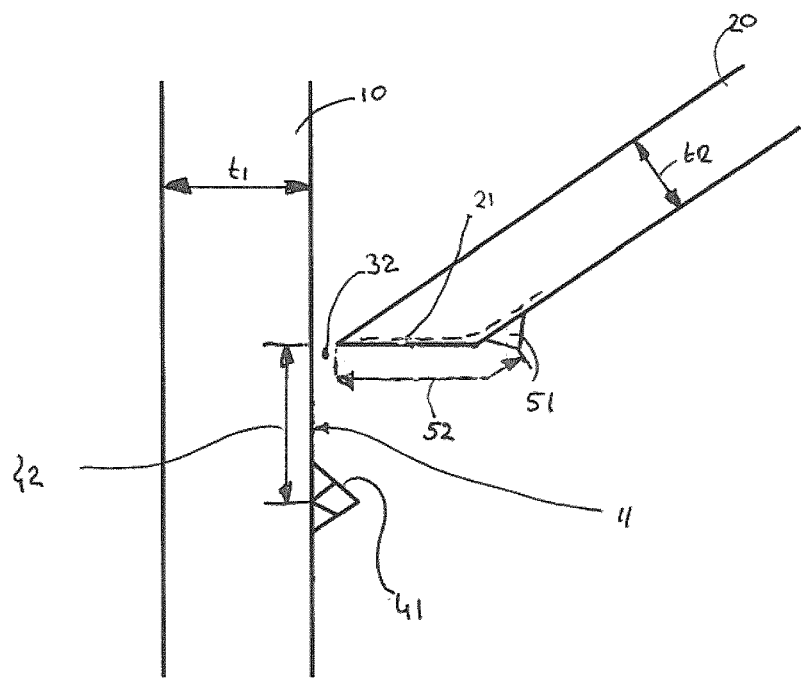
Figure 8:
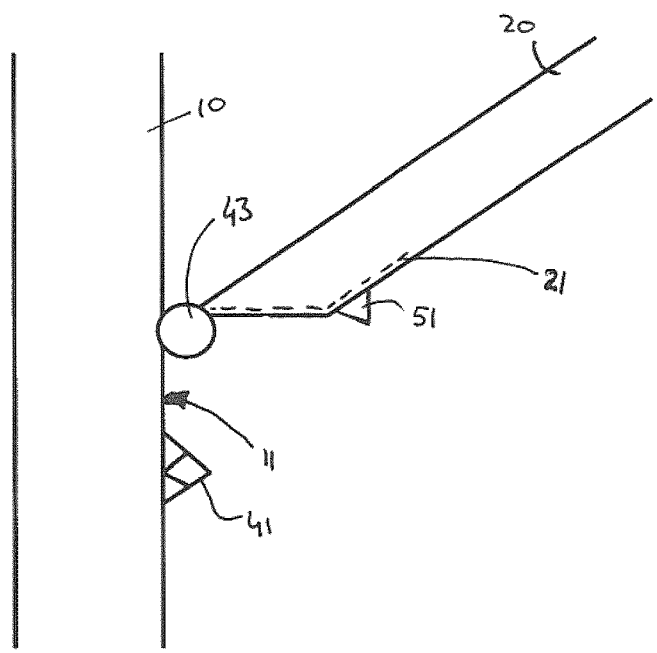
Figure 9:
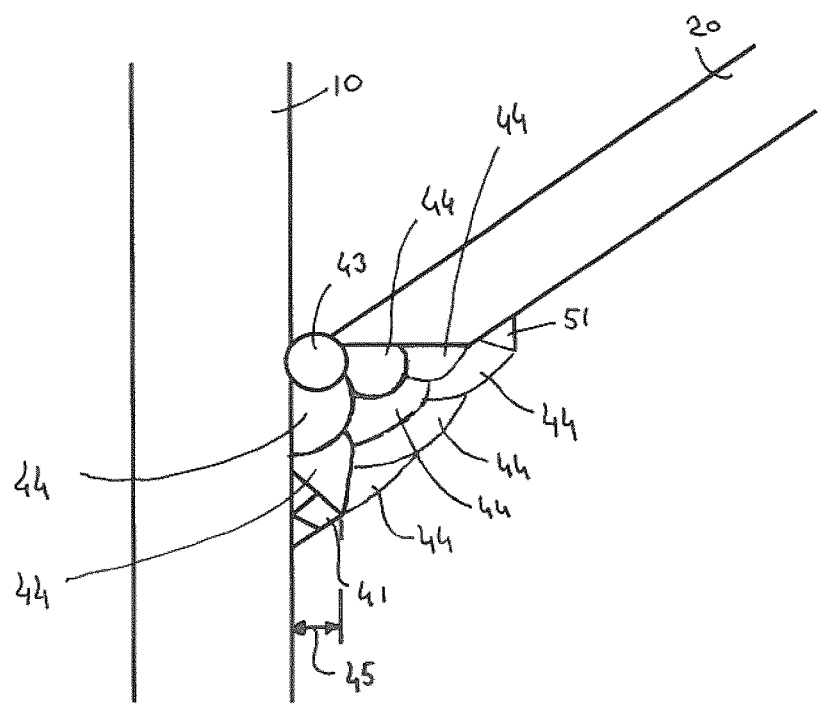
Figure 10:
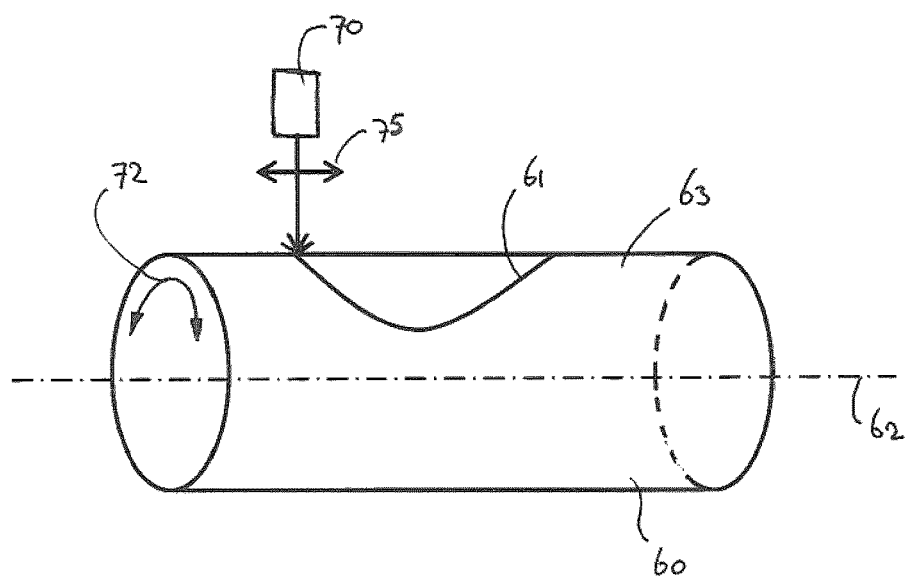
Figure 11:
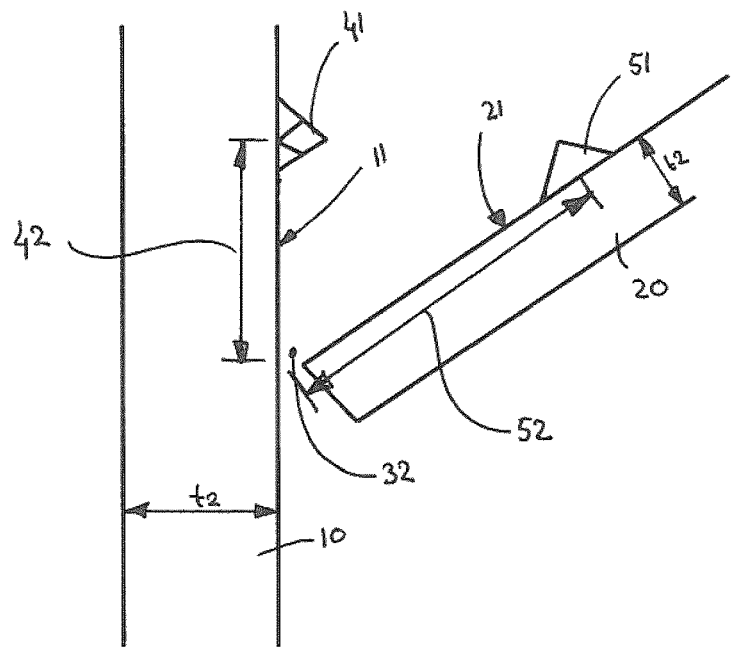
Figure 12:
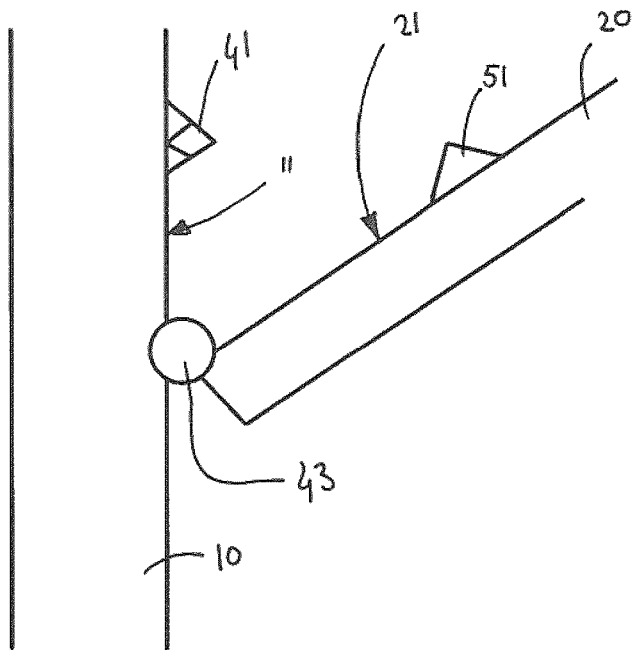
Figure 13:
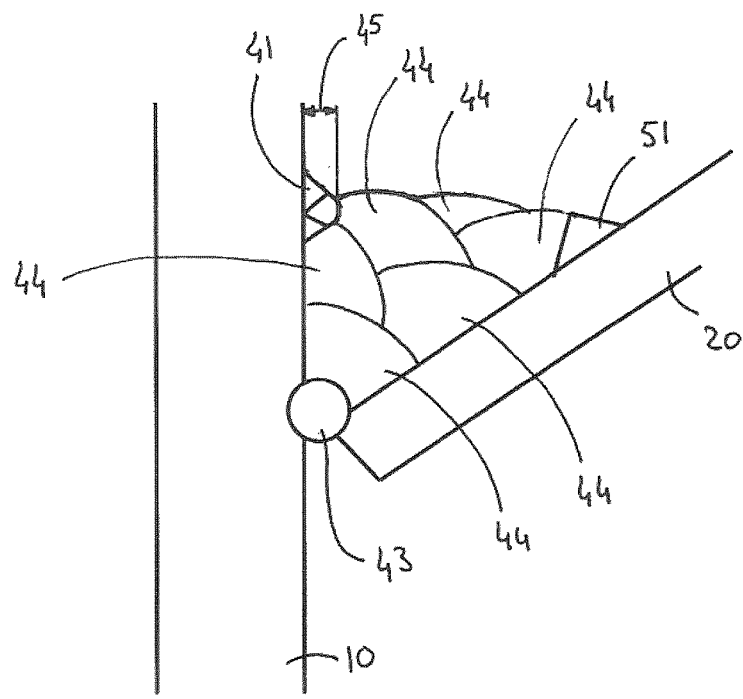
Figure 14:
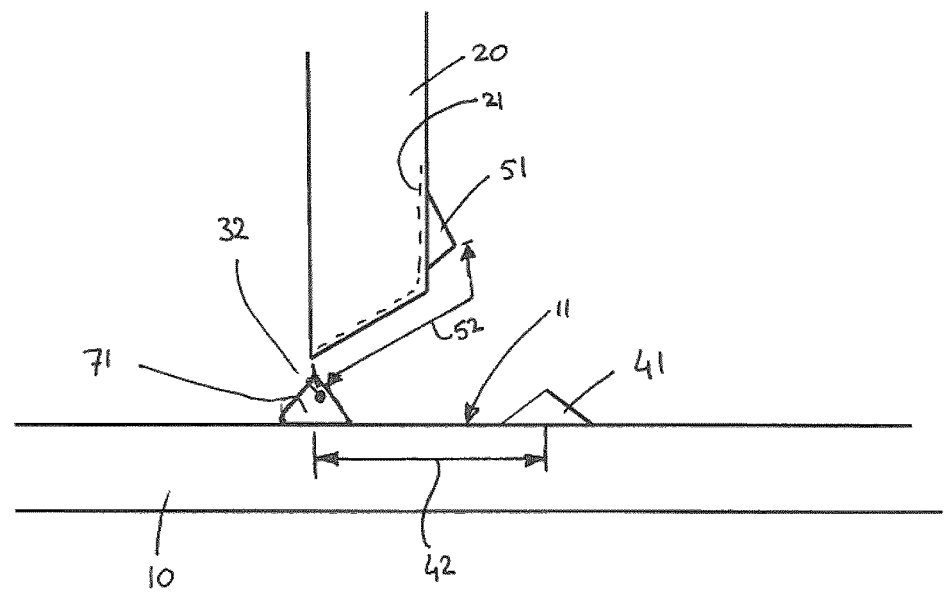
Figure 15:
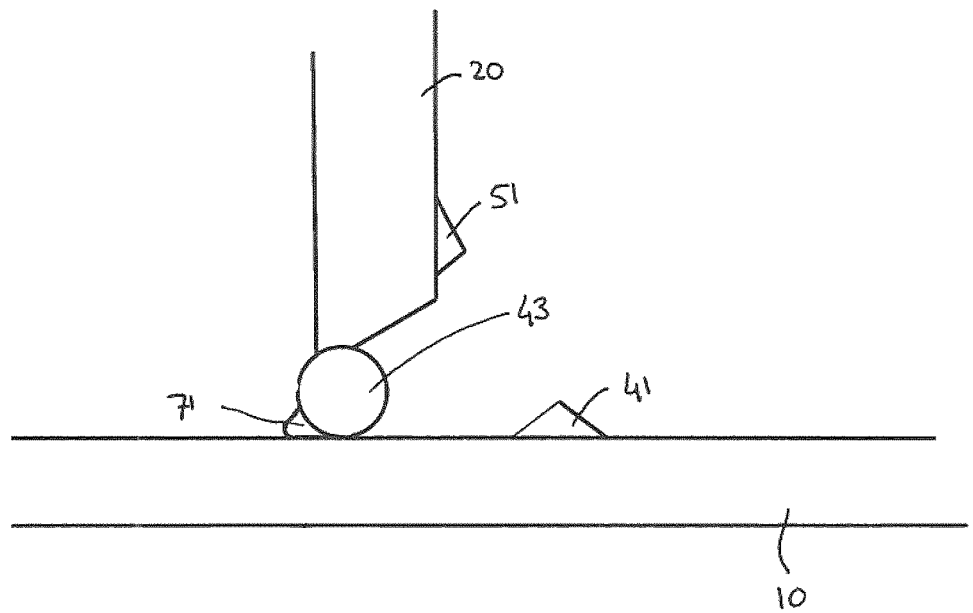
Figure 16:
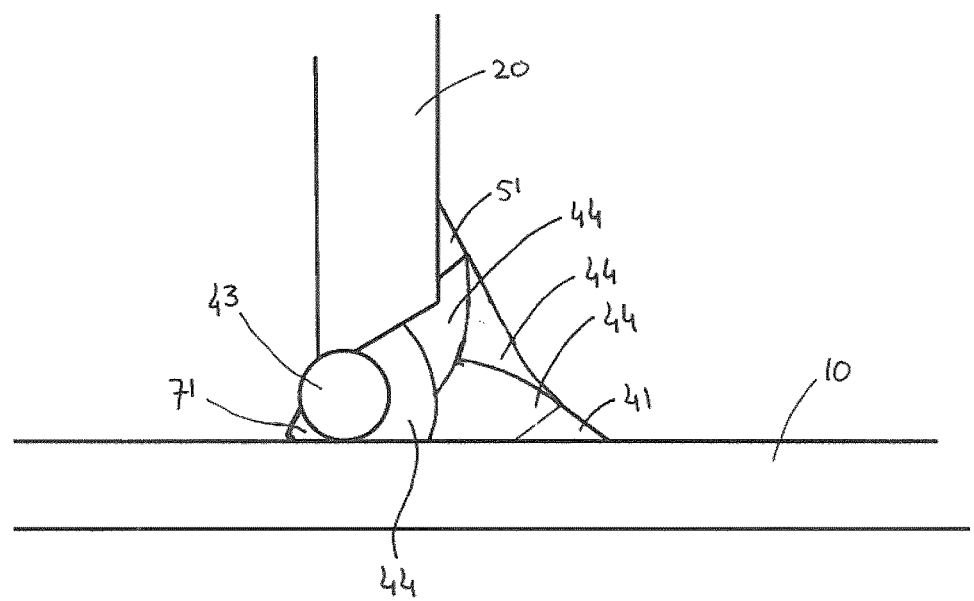
Figure 17:
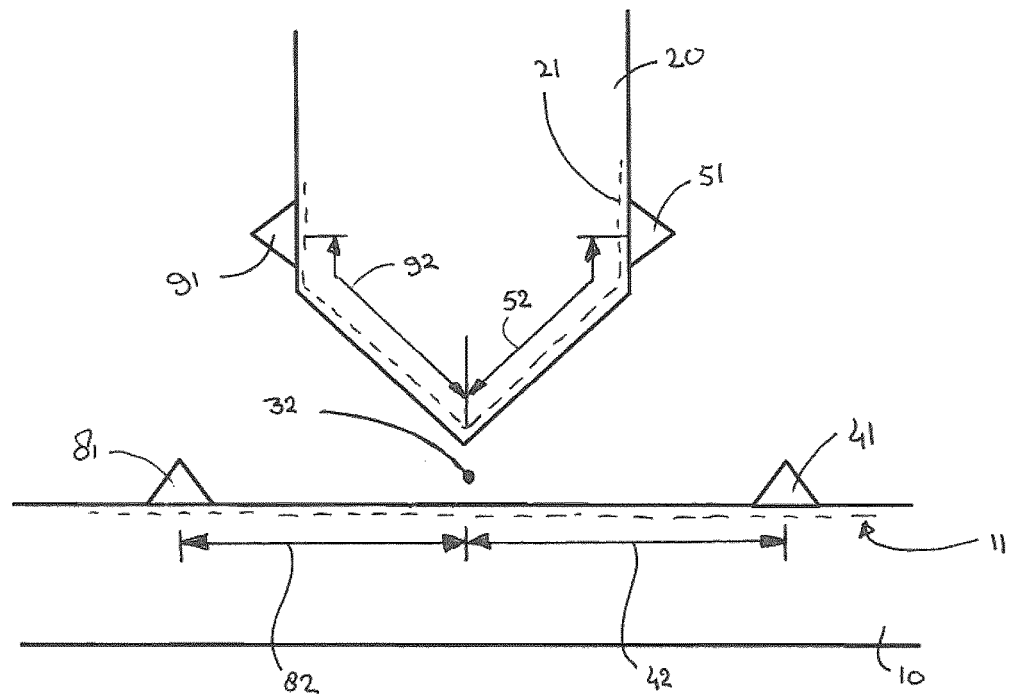
Figure 18:
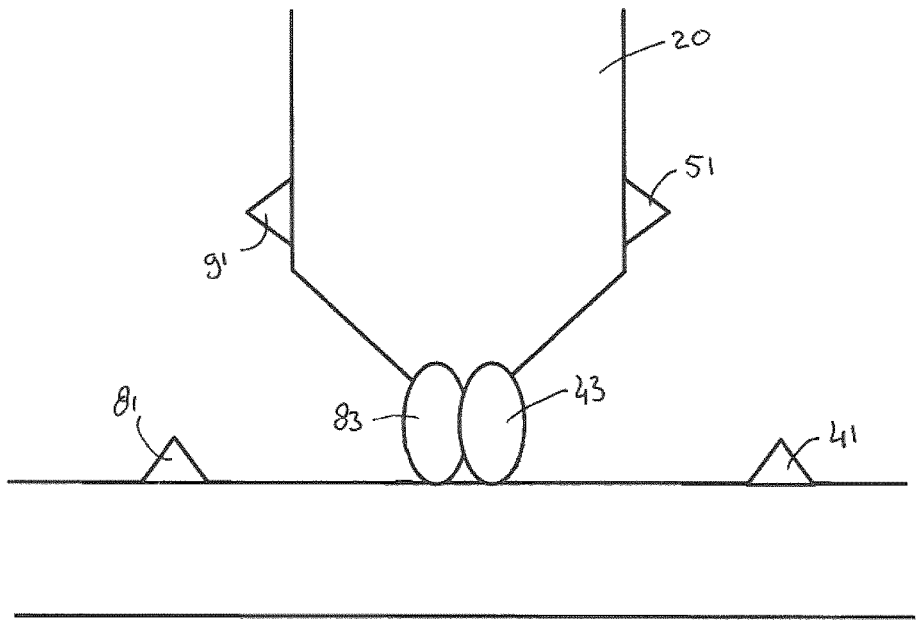
Figure 19:
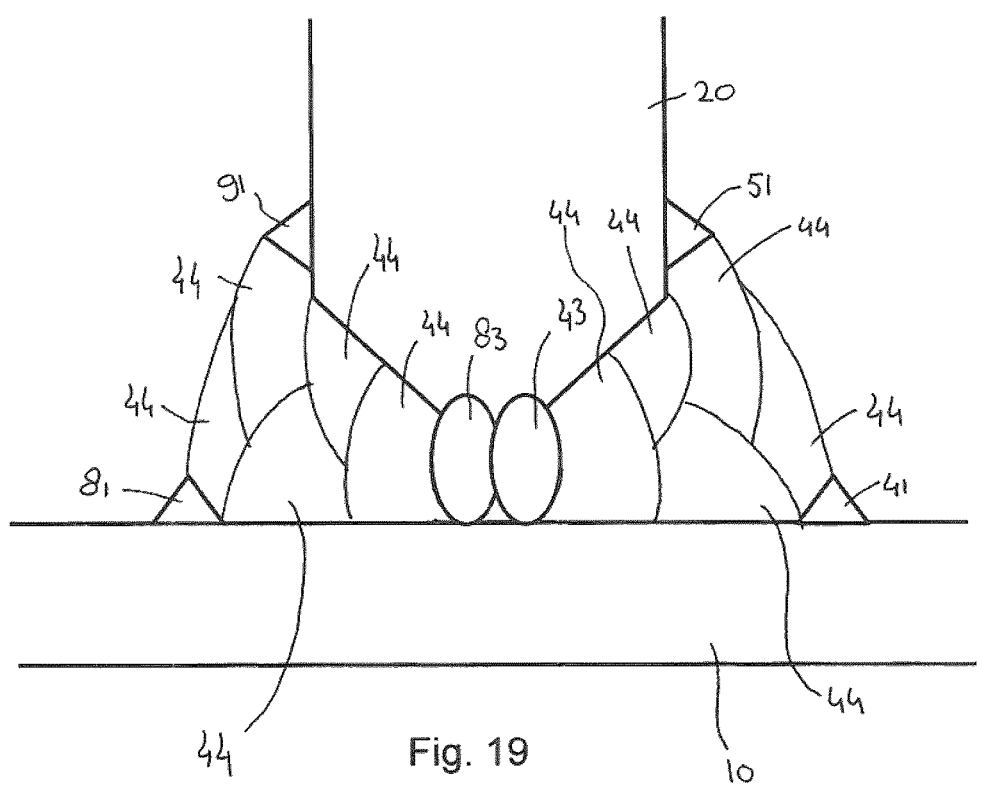

The drawing shows in:

FIG. 1: an example of a multi-pass welded joint,

FIG. 2: a first stage in a first embodiment of the method according to the invention, FIG. 3: a subsequent stage in said first embodiment of the method according to the invention, FIG. 4: the stage of FIG. 3 in said first embodiment of the method according to the invention at a more detailed level, in cross section, FIG. 5: a further subsequent stage in said first embodiment of the method according to the invention, FIG. 6: a further subsequent stage in said first embodiment of the method according to the invention, FIG. 7: the first construction element and the second construction element in the joining position, in a second embodiment of the method according to the invention, FIG. 8: a subsequent stage in said second embodiment of the method according to the invention, FIG. 9: a further subsequent stage in said second embodiment of the method according to the invention, FIG. 10: a possible way of applying a stand-alone toe weld, FIG. 11: a detail of a possible situation at the upper part of the joint between a cylindrical first construction element and a cylindrical second construction element, with the first construction element and the second construction element in the joining position, FIG. 12: a subsequent stage in the embodiment shown in FIG. 11, FIG. 13: a further subsequent stage in the embodiment shown in FIG. 11, FIG. 14: the first construction element and the second construction element in the joining position, in a third embodiment of the method according to the invention, FIG. 15: a subsequent stage in said third embodiment of the method according to the invention, FIG. 16: a further subsequent stage in said third embodiment of the method according to the invention FIG. 17: the first construction element and the second construction element in the joining position, in a fourth embodiment of the method according to the invention, FIG. 18: a subsequent stage in said fourth embodiment of the method according to the invention, FIG. 19: a further subsequent stage in said fourth embodiment of the method according to the invention.

FIG. 1 shows an example of a multi-pass welded joint 1. The multi-pass welded joint 1 connects a first metal construction element 10 and a second metal construction element 20 with each other. The first construction element 10 is provided with a welding area 11, and the second construction element 20 is provided with a welding area 21.

The first construction element 10 and the second construction element 20 are shown in the joining position in FIG. 1. This is the relative position in which they will be connected to each other by the welded joint. After welding, the first construction element 10 and the second construction element 20 generally remain in the joining position, apart from minor local deviations which can for example be caused by weld zone distortion, for example shrinkage.

In the embodiment of FIG. 1, the first construction element 10 and the second construction element 20 do not touch each other. A welding gap 3 is present between the first construction element 10 and the second construction element 20.

The multi-pass welded joint 1 comprises a multi-pass weld 30. The multi-pass welded joint 1 has a root area 32, which is generally, schematically indicated by circle 32*a*. The root area 32 is situated where the welding pass is made with the electrode of the welding torch positioned the deepest in the welding seam. In the embodiment of FIG. 1, the welded joint 1 is made from one side (from the right side in FIG. 1), so the root area is the left-most area of the weld 1.

The multi-pass welded joint 1 further has a first toe area 31, which is generally, schematically indicated by the circle 31*a*. This first toe area 31 is generally the most susceptible to fatigue cracking.

The multi-pass welded joint 1 further has a second toe area 33, which is generally, schematically indicated by the circle 33*a*. This area is also susceptible to fatigue cracking, but generally not as much as the first toe area 31.

FIG. 2 shows a first stage in a first embodiment of the method according to the invention. In this embodiment, a first metal construction element 10 is provided that is cylindrical. It has a longitudinal axis 12 and an outer wall 13. A welding area 11 is provided on the outer wall 13 of the first construction element 10. In FIG. 2, the welding area 11 is present in the area between the two dotted lines on the outer wall 13 of the first construction element 10. Optionally, the welding area 11 is ground.

Furthermore, a second metal construction element 20 is provided that is cylindrical. It has a longitudinal axis 22 and an outer wall 23. A welding area 21 is provided on the second construction element 20. In the embodiment of FIG. 2, the welding area 21 is present on an end surface of the second construction element 20, and optionally extends to on the outer wall in the vicinity of said end of the seconds construction element. Optionally, the welding area 21 is ground.

In the first embodiment as shown in FIG. 2, the welding area 11 of the first construction element 10 has the shape of a projected image of a circle, which circle has a circle diameter, which image is projected on the outer wall 13 of the first construction element 10 at an angle that is the same as the relative angle between the first construction element 10 and the second construction element 20 in the joining position. In the example of FIG. 2, the welding area 11 of the first construction element 10 has a more or less elliptic shape, due to the cylindrical outer wall 13 of the first construction element 10 and the angle between the first construction element 10 and the second construction element 20, which angle is other than 0°, 90° or 180°.

It is possible that an opening is provided in the outer wall 13 of the first construction element, which opening is arranged within the inner diameter of the welding area 11. It is however not necessary that such an opening is present. In the embodiment shown in FIG. 2, such an opening is not provided in the outer wall 13 of the first construction element 10.

In accordance with the invention, a first stand-alone toe weld 41 is applied onto the welding area 11 of the first construction element 10. The first stand-alone toe weld 41 is in this stage of the method according to the first embodiment of the invention only connected to the first construction element 10, not to the second construction element 20.

As indicated above, in the first embodiment as shown in FIG. 2, the first stand-alone toe weld 41 has an elliptical shape which is the projected image of a circle. This circle has a circle diameter that is larger than the outer diameter of the second construction element 20.

The first stand-alone toe weld is applied onto the first construction element after any optional pre toe welding treatment of the welding area 11 of the first construction element 10, such as grinding.

The first stand-alone toe weld 41 is optionally applied in a downhand welding position, with the welding torch above the weld that is made and a generally horizontal relative movement of the welding torch and the first construction element.

Optionally, the first construction element 10 is rotated about its longitudinal axis 12 during the application of the first stand-alone toe weld 41.

Optionally, the first stand-alone toe weld 41 is made using an automated welding process. For example, a welding robot can be used to make the first stand-alone toe weld 41.

Optionally, the first stand-alone toe weld 41 and/or the welding area 11 adjacent to the first stand-alone toe weld 41 receives a post toe welding treatment after application of the first stand-alone toe weld 41 onto the first construction element 10, such as grinding, hammering, shot-peening or a thermal treatment.

It is possible that a first construction element 10 as shown in FIG. 2 (including the first stand-alone toe weld 41) is made at a different location than the location in which subsequent steps of the method according to the invention (in particular the steps of arranging the first construction element 10 and the second construction element 20 in the joining position and the application of the root pass and filling beads) take place. In particular in that case, the first construction element 10 is optionally provided with a protective cover 46 that extends over the first stand-alone toe weld 41. This protective cover protects the first stand-alone toe weld 41 during storage and/or transport. Optionally, such a protective cover extends over the entire welding area 11 of the first construction element 10. Also in other situations such a protective cover 46 can be useful, for example in cases wherein the first stand-alone toe weld is made some time before the first construction element 10 and the second construction element 20 are welded together.

FIG. 3 shows a subsequent stage in said first embodiment of the method according to the invention.

FIG. 3 shows the first construction element 10 and the second construction element 20 as they are arranged in the joining position. The second construction element 20 is arranged with its outer diameter within the perimeter of the first stand-alone toe weld 41.

In the joining position, a distance 42 is present between the first stand-alone toe weld and the root area of the multi-pass weld join to be created. This distance is shown somewhat exaggerated in FIG. 3 for reasons of clarity.

FIG. 4 shows the stage of FIG. 3 in said first embodiment of the method according to the invention at a more detailed level, in cross section. The first construction element 10 and the second construction element 20 are arranged in the joining position. FIG. 4 shows the situation at or near the lowest part of the joint between the first construction element 10 and the second construction element 20.

FIG. 4 shows in cross section a wall part of the first construction element 10, which wall part comprises the welding area 11. Further, a wall part of the second construction element 20 is shown, which wall part comprises the welding area 21.

FIG. 4 also shows the first stand-alone toe weld 41. In this example, the first stand-alone toe weld 41 comprises three toe weld beads 41a, 41b, 41c. The first stand-alone toe weld 41 is applied to the first construction element 10 before the first construction element 10 and the second construction element 20 are arranged in the joining position In accordance with the invention, a distance 42 (seen along the welding area 11) is present between the root area 32 of the welded joint to be created and the first stand-alone toe weld 41. Optionally, the edge of the first stand-alone toe weld 41 may extend into the root area 32. However, in accordance with the invention, a distance is present between the root area and the center of the first stand-alone toe weld.

Optionally, in the joining position as is shown in FIG. 4, the distance 42 between the first stand-alone toe weld 41 and the root area 32 of the welded joint, measured from the root area 32 of the weld to be created to the center of the first stand-alone toe weld 41 is between 1 and 2.5 times the local wall thickness t2 of the second construction element 20 in the vicinity of the welded joint, preferably between 1.3 and 1.7 times the local wall thickness t2 of the second construction 20 element in the vicinity of the welded joint.

FIG. 5 shows a further subsequent stage in said first embodiment of the method according to the invention, in the area of the joint that is also shown in FIG. 4.

Starting from the situation shown in FIG. 3 and FIG. 4, now a root pass 43 is applied at the root area 32 of the welded joint to be created. The root pass 43 is the first weld connection between the first construction element 10 and the second construction element 20. The root pass 43 actually is the first part of the multi-pass welded joint that actually connects the first construction element 10 and the second construction element 20 structurally with each other. Optionally, the making of the root pass is preceded by the application of one or more tack welds, but these dissolve in the actual root pass when the root pass is made or are ground out before the root pass is made. So, the tack welds do not structurally and sustained connect the first construction element 10 and the second construction element 20 with each other.

The root pass 43 comprises one or more root pass beads.

FIG. 6 shows a further subsequent stage in said first embodiment of the method according to the invention in the area of the joint that is also shown in FIG. 4 and FIG. 5.

Starting from the situation shown in FIG. 5, now a plurality of filling beads 44 is applied. Together with the first stand-alone toe weld 41 and the root pass 43, the filling beads 44 form part of the multi-pass welded joint 1 between the first construction element 10 and the second construction element 20. The filling beads 44 do not extend beyond the first stand-alone toe weld 41 on the surface of the first construction element 10.

As can be seen in FIG. 6, the first stand-alone toe weld 41 has a height 45 over which it projects outwardly relative to the welding area of the first construction element. Optionally, this height 45 is between 5% and 25% of the local wall thickness t1 of the first construction element 10 in the vicinity of the first stand-alone toe weld 41, preferably between 10% and 20% of the local wall thickness t1 of the first construction element 10 in the vicinity of the first stand-alone toe weld 41.

As FIG. 6 shows, the height 45 of the first stand-alone toe weld 41 is the distance from the surface of the first construction element 10 to the point (or line) on the outer surface of the multi-pass weld where the first stand-alone toe 41 weld meets the adjacent filling bead 44.

FIG. 7, FIG. 8 and FIG. 9 show subsequent stages of a second embodiment of the method according to the invention. In this second embodiment, optionally the first and second metal construction elements 10, 20 are cylindrical.

This second embodiment of the method according to the invention is different from the first embodiment of the method according to the invention that is shown in FIG. 2, FIG. 3, FIG. 4, FIG. 5 and FIG. 6, in that in the second embodiment also the second metal construction element 20 is provided with a stand-alone toe weld 51. This stand-alone toe weld which is applied onto the second construction element 20 is called the second stand-alone toe weld 51.

The first stand-alone toe weld 41 is applied onto the first metal construction element 10 in this second embodiment in the same way in which it is applied in the first embodiment of the method according to the invention (see FIG. 2).

Before the first construction element 10 and the second construction element 20 are arranged in the joining position, the second stand-alone toe weld 51 is applied onto the welding area 21 of the second construction element 20.

The second stand-alone toe weld 51 is in this stage of the method according to the second embodiment of the invention only connected to the second construction element 20, not to the first construction element 10. The second stand-alone toe weld 51 extends around the outer wall of the second construction element 20.

The second stand-alone toe weld is applied onto the second construction element after any optional pre toe welding treatment of the welding area 21 of the second construction element 20, such as grinding. In the embodiment shown in FIG. 6, FIG. 8 and FIG. 9, the welding area 21 of the second construction element welding area 21 is present on an end surface of the second construction element 20, and extends on the outer wall in the vicinity of said end of the seconds construction element, as indicated by the dashed line in FIG. 7 and FIG. 8.

The second stand-alone toe weld 51 is optionally applied in a downhand welding position, with the welding torch above the weld that is made and a generally horizontal relative movement of the welding torch and the second construction element.

Optionally, the second construction element 20 is rotated about its longitudinal axis 12 during the application of the second stand-alone toe weld 51.

Optionally, the second stand-alone toe weld 51 is made using an automated welding process. For example, a welding robot can be used to make the second stand-alone toe weld 51.

Optionally, the second stand-alone toe weld 51 and/or the welding area 21 adjacent to the second stand-alone toe weld 51 receives a post toe welding treatment after application of the second stand-alone toe weld 51 onto the second construction element 20, such as grinding, hammering, shot-peening or a thermal treatment.

It is possible that a second construction element 20 as shown in FIG. 2 (which in the embodiment of FIG. 7, FIG.

8 and FIG. 9 includes a second stand-alone toe weld 51) is made at a different location than the location in which subsequent steps of the method according to the invention (in particular the steps of arranging the second construction element 20 and the second construction element 20 in the joining position and the application of the rood weld and filling beads) take place. Optionally, it is made at a location that is different from the location where the first construction element 10 is made. The second construction element 20 is optionally provided with a protective cover that extends over the second stand-alone toe weld 51. This protective cover protects the second stand-alone toe weld 51 during storage and/or transport. Optionally, such a protective cover extends over the entire welding area 21 of the second construction element 20.

After the first construction element 10 is provided with the first stand-alone toe weld 41 and after the second construction element 20 is provided with the second stand-alone toe weld 51, the first construction element 10 and the second construction element 20 are arranged in the joining position. This is shown in FIG. 7.

Optionally, in case both construction elements 10, 20 are cylindrical, the second construction element 20 is arranged with its outer diameter within the perimeter of the first stand-alone toe weld 41.

FIG. 7 shows in cross section a wall part of the first construction element 10, which wall part comprises the welding area 11. Further, in cross section a wall part of the second construction element 20 is shown, which wall part comprises the welding area 21. FIG. 7 shows the situation at or near the upper part of the joint between the first construction element 10 and the second construction element 20. FIG. 11 shows the situation at or near the lowest part of the joint between the first construction element 10 and the second construction element 20.

FIG. 7 also shows the first stand-alone toe weld 41. In this example, the first stand-alone toe weld 41 comprises three toe weld beads. Furthermore, the second stand-alone toe weld 51 is shown. In this example, the second stand-alone toe weld 51 comprises a single toe weld bead, but alternatively it is possible that the stand-alone toe weld 51 comprises multiple toe weld beads. The first stand-alone toe weld 41 is applied to the first construction element 10 before the first construction element 10 and the second construction element 20 are arranged in the joining position. Likewise, the second stand-alone toe weld 51 is applied to the second construction element 20 before the first construction element 10 and the second construction element 20 are arranged in the joining position.

In accordance with the invention, a distance 42 (seen along the welding area 11) is present between the root area 32 of the welded joint to be created and the first stand-alone toe weld 41. Optionally, the edge of the first stand-alone toe weld 41 may extend into the root area 32. However, in accordance with the invention, a distance is present between the root area and the center of the first stand-alone toe weld.

Likewise, a distance 52 is present between the second stand-alone toe weld 51 and the root area 32 of the multi-pass weld join to be created. Generally, the edge of the second stand-alone toe weld 51 will not extend into the root area 32, but in some embodiments it will be possible that the edge of the second stand-alone toe weld 51 extends into the root area 32.

Optionally, in the joining position as is shown in FIG. 7, the distance 42 between the first stand-alone toe weld 41 and the root area 32 of the welded joint, measured from the root area 32 of the weld to be created to the center of the first stand-alone toe weld 41 is between 1 and 2.5 times the local wall thickness t2 of the second construction element 20 in the vicinity of the welded joint, preferably between 1.3 and 1.7 times the local wall thickness t2 of the second construction 20 element in the vicinity of the welded joint.

FIG. 8 shows a further subsequent stage in said second embodiment of the method according to the invention, in the area of the joint that is also shown in FIG. 7.

Starting from the situation shown in FIG. 7, now a root pass 43 is applied at the root area of the welded joint to be created. The root pass 43 is the first weld connection between the first construction element 10 and the second construction element 20. The root pass 43 actually is the first part of the multi-pass welded joint that actually connects the first construction element 10 and the second construction element 20 structurally and sustained with each other. Optionally, the making of the root pass is preceded by the application of one or more tack welds, but these dissolve in the actual root pass when the root pass is made or are ground out before the root pass is made. So, the tack welds do not structurally and sustained connect the first construction element 10 and the second construction element 20 with each other.

The root pass 43 comprises one or more root pass beads.

FIG. 9 shows a further subsequent stage in said second embodiment of the method according to the invention, in the area of the joint that is also shown in FIG. 7 and FIG. 8.

Starting from the situation shown in FIG. 8, now a plurality of filling beads 44 is applied. Together with the first stand-alone toe weld 41, the second stand-alone toe weld 51 and the root pass 43, the filling beads 44 form part of the multi-pass welded joint 1 between the first construction element 10 and the second construction element 20.

The filling beads 44 do not extend beyond the first stand-alone toe weld 41 on the surface of the first construction element 10 and also not beyond the second stand-alone toe weld 51 on the surface of the second construction element 20.

As can be seen in FIG. 9, the first stand-alone toe weld 41 has a height 45 over which it projects outwardly relative to the welding area of the first construction element. Optionally, this height 45 is between 5% and 25% of the local wall thickness t1 of the first construction element 10 in the vicinity of the first stand-alone toe weld 41, preferably between 10% and 20% of the local wall thickness t1 of the first construction element 10 in the vicinity of the first stand-alone toe weld 41.

As FIG. 9 shows, the height 45 of the first stand-alone toe weld 41 is the distance from the surface of the first construction element 10 to the point (or line) on the outer surface of the multi-pass weld where the first stand-alone toe 41 weld meets the adjacent filling bead 44.

FIG. 10 shows a possible way of applying a stand-alone weld 61 on the outer wall 63 of a metal cylindrical construction element 60. The cylindrical construction element 60 has a longitudinal axis 62. The applied stand-alone weld can for example be a first stand-alone toe weld, a second stand-alone toe weld or a stand-alone base weld.

It has been found that when a downhand welding position is used to apply a stand-alone weld onto a construction element, this has a positive effect on the fatigue strength of the multi-pass welded joint.

A possible way of making the entire stand-alone weld in a downhand position, even when the stand-alone weld is to be applied onto a curved surface of the construction element, is shown in FIG. 10. In the embodiment shown in FIG. 10, the curved surface of the construction element 61 onto which the stand-alone weld 61 is to be applied is the outer wall 63 of a cylindrical construction element 61.

In this embodiment, a welding torch 70 is provided. This welding torch 70 can be operated by a human operator or by automated welding equipment such as a welding robot. Preferably, automated welding equipment is used because this generally provides a more constant weld quality.

During the application of the stand-alone weld 61, the cylindrical construction element 60 is rotated about its longitudinal axis 62 (see arrow 72) in order to make that at the point were the stand-alone weld 61 is formed the stand-alone weld 61 extends substantially horizontally. The welding torch 70 is arranged above the stand-alone weld 61 when the stand-alone weld 61 is formed.

During the application of the stand-alone weld 61, either the welding tip of the welding torch 70 and/or the cylindrical construction element 60 is moved in a horizontal direction, parallel to the longitudinal axis 62 of the cylindrical construction element 60 (see arrow 75).

The combined movements of the cylindrical construction element or of the cylindrical construction element 60 and the welding torch 70 together produce a stand-alone weld with the desired shape while maintaining the downhand welding position throughout the application of the entire stand-alone weld bead.

Optionally, at least one stand-alone weld bead forms a continuous closed loop.

FIG. 11, FIG. 12 and FIG. 13 show a detail of a possible situation at the upper part of the joint between a cylindrical first construction element 10 and a cylindrical second construction element 20 in an embodiment of the invention in which a second stand-alone toe weld 51 is present. A similar situation may occur when a second construction element e.g. in the form of a flat plate is welded to the first construction element under an acute angle.

In the embodiment shown in FIG. 11, FIG. 12 and FIG. 13, a second stand-alone toe weld 51 is present. The presence of this second stand-alone toe weld 51 is optional.

FIG. 11 shows in cross section a wall part of the first construction element 10, which wall part comprises the welding area 11. Further, in cross section a wall part of the second construction element 20 is shown, which wall part comprises the welding area 21. FIG. 11 shows the situation at or near the lowest part of the joint between the first construction element 10 and the second construction element 20.

FIG. 11 also shows the first stand-alone toe weld 41. In this example, the first stand-alone toe weld 41 comprises three toe weld beads. Furthermore, the second stand-alone toe weld 51 is shown. In this example, the second stand-alone toe weld 51 comprises a single toe weld bead, but alternatively it is possible that the stand-alone toe weld 51 comprises multiple toe weld beads. The first stand-alone toe weld 41 is applied to the first construction element 10 before the first construction element 10 and the second construction element 20 are arranged in the joining position. Likewise, the second stand-alone toe weld 51 is applied to the second construction element 20 before the first construction element 10 and the second construction element 20 are arranged in the joining position.

In accordance with the invention, a distance 42 (seen along the welding area 11) is present between the root area 32 of the welded joint to be created and the first stand-alone toe weld 41. Optionally, the edge of the first stand-alone toe weld 41 may extend into the root area 32. However, in accordance with the invention, a distance is present between the root area and the center of the first stand-alone toe weld.

Likewise, a distance 52 is present between the second stand-alone toe weld 51 and the root area 32 of the multi-pass weld join to be created. Generally, the edge of the second stand-alone toe weld 51 will not extend into the root area 32, but in some embodiments it will be possible that the edge of the second stand-alone toe weld 51 extends into the root area 32.

Optionally, in the joining position as is shown in FIG. 11, the distance 42 between the first stand-alone toe weld 41 and the root area 32 of the welded joint, measured from the root area 32 of the weld to be created to the center of the first stand-alone toe weld 41 is between 1 and 2.5 times the local wall thickness t2 of the second construction element 20 in the vicinity of the welded joint, preferably between 1.3 and 1.7 times the local wall thickness t2 of the second construction 20 element in the vicinity of the welded joint.

FIG. 12 shows a subsequent stage in the embodiment shown in FIG. 11.

Starting from the situation shown in FIG. 11, now a root pass 43 is applied at the root area of the welded joint to be created. The root pass 43 is the first weld connection between the first construction element 10 and the second construction element 20. The root pass 43 actually is the first part of the multi-pass welded joint that actually connects the first construction element 10 and the second construction element 20 structurally with each other. Optionally, the making of the root pass is preceded by the application of one or more tack welds, but these dissolve in the actual root pass when the root pass is made. So, the tack welds do not structurally connect the first construction element 10 and the second construction element 20 with each other.

The root pass 43 comprises one or more root pass beads.

FIG. 13 shows a further subsequent stage in the embodiment shown in FIG. 11.

Starting from the situation shown in FIG. 12, now a plurality of filling beads 44 is applied. Together with the first stand-alone toe weld 41, the second stand-alone toe weld 51 and the root pass 43, the filling beads 44 form part of the multi-pass welded joint 1 between the first construction element 10 and the second construction element 20.

The filling beads 44 do not extend beyond the first stand-alone toe weld 41 on the surface of the first construction element 10 and also not beyond the second stand-alone toe weld 51 on the surface of the second construction element 20.

As can be seen in FIG. 13, the first stand-alone toe weld 41 has a height 45 over which it projects outwardly relative to the welding area of the first construction element. Optionally, this height 45 is between 5% and 25% of the local wall thickness t1 of the first construction element 10 in the vicinity of the first stand-alone toe weld 41, preferably between 10% and 20% of the local wall thickness t1 of the first construction element 10 in the vicinity of the first stand-alone toe weld 41.

FIG. 13 further shows that the height 45 is less then the height over which the first stand-alone toe weld 41 protruded from the surface of the first construction element 10 before the filling beads 44 were applied. This is due to the application of the filling beads 44 adjacent to the first stand-alone toe weld 41 causing some melting of the first stand-alone toe weld 41. This of course also may occur in the other embodiments.

FIG. 14 shows the first construction element and the second construction element in the joining position, in a third embodiment of the method according to the invention.

In this third embodiment of the invention, a stand-alone base weld 71 is provided in the root area 32 of the multi-pass weld that is to be created between the first construction element 10 and the second construction element 20.

In the third embodiment shown in FIG. 14, FIG. 15 and FIG. 16, in addition to the stand-alone base weld 71, a first stand-alone toe weld 41 and a second stand-alone toe weld 51 are provided. However, in variants of the embodiment in FIG. 14, FIG. 15 and FIG. 16, no stand-alone toe welds, only one or more first stand-alone toe welds, only one or more second stand-alone-toe welds or a plurality of first stand-alone toe welds and a plurality of second stand-alone toe welds may be provide.

FIG. 14 shows in cross section a wall part of the first construction element 10, which wall part comprises the welding area 11. Further, in cross section a wall part of the second construction element 20 is shown, which wall part comprises the welding area 21.

The construction elements 10, 20 may have any suitable shape, e.g. cylindrical or flat.

In the embodiment of FIG. 14, FIG. 15 and FIG. 16, the first construction element 10 is provided with a stand-alone base weld 71. The stand-alone base weld 71 is applied to the first construction element 10 before the first construction element 10 and the second construction element 20 are arranged in the joining position, which joining position is shown in FIG. 14.

In a variant to this embodiment, a further stand-alone base weld (not shown) is provided on the second construction element in addition to the stand-alone base weld 71 on the first construction element. In a further variant to this embodiment, a further stand-alone base weld (not shown) is provided on the second construction element as an alternative to the stand-alone base weld 71 on the first construction element.

In the embodiment of FIG. 14, FIG. 15 and FIG. 16, the first construction element 10 is further provided with a first stand-alone toe weld 41. The first stand-alone toe weld 41 is applied to the first construction element 10 before the first construction element 10 and the second construction element 20 are arranged in the joining position, which joining position is shown in FIG. 14. The first stand-alone toe weld 41 can be applied to the first construction element 10 before, after or simultaneous with the application of the stand-alone base weld 71.

After the stand-alone base weld 71 and any optional first stand-alone toe welds has/have been applied to the first construction element 10 and optionally after any optional second stand-alone toe welds 51 have been applied to the second construction element 20, the first and second construction element are arranged in the joining position, which is shown in FIG. 14.

Optionally, in the period between the application of the stand-alone base weld 71 and the arrangement of the first construction element 10 and the second construction element 20 in the joining position, a protective cover is provided to cover the stand-alone base weld 71, for example to protect it from corrosion or damage during transport and/or storage. Optionally, the protective cover also extends over any first stand-alone toe welds that are provided on the first construction element 10.

FIG. 15 shows a subsequent stage in the embodiment of FIG. 14.

Starting from the situation shown in FIG. 14, now a root pass 43 is applied at the root area of the welded joint to be created. The root pass 43 is the first weld connection between the first construction element 10 and the second construction element 20. The root pass 43 actually is the first part of the multi-pass welded joint that actually connects the first construction element 10 and the second construction element 20 structurally with each other.

The root pass 43 may partially dissolve the stand-alone base weld 71, but at least a part of the stand-alone base weld 71 remains after the application of the root pass 43, and preferably a significant part (e.g. at least 30%) of the stand-alone base weld 71 remains. This is advantageous, because then the good properties of the stand-alone base weld 71 contribute to the quality, geometry, strength and properties of the entire multi-pass weld that is being made.

Optionally, the making of the root pass is preceded by the application of one or more tack welds, but these dissolve in the actual root pass when the root pass is made or are ground out before the root pass is made. So, the tack welds do not structurally and sustained connect the first construction element 10 and the second construction element 20 with each other. The tack welds are different from the stand-alone base weld 71 in that the tack welds connect the first construction element 10 and the second construction element 20 with each other, while the stand-alone base weld 71 does not.

The root pass 43 comprises one or more root pass beads.

FIG. 16 shows a further subsequent stage in the embodiment shown in FIG. 14.

Starting from the situation shown in FIG. 15, now a plurality of filling beads 44 is applied. Together with the stand-alone base weld, the optional first stand-alone toe weld 41, the optional second stand-alone toe weld 51 and the root pass 43, the filling beads 44 form part of the multi-pass welded joint 1 between the first construction element 10 and the second construction element 20.

The filling beads 44 do not extend beyond the first stand-alone toe weld 41 on the surface of the first construction element 10 and also not beyond the second stand-alone toe weld 51 on the surface of the second construction element 20.

FIG. 17 shows a first construction element and a second construction element in the joining position, in a fourth embodiment of the method according to the invention.

In this fourth embodiment of the invention, a plurality of first stand-alone toe welds 41,81 and a plurality of second stand-alone toe welds 51, 91 is provided.

In a variant of the embodiment of FIG. 17, a single first stand-alone toe weld 41 is provided along with multiple second stand-alone toe welds 51, 91. In a different variant of the embodiment of FIG. 17, a single second stand-alone toe weld 51 is provided along with multiple first stand-alone toe welds 41, 81. In a further variant of the embodiment of FIG. 17, multiple first stand-alone toe welds 41, 81 are provided and no second stand-alone toe weld.

The presence of multiple first stand-alone toe welds and/or multiple second stand-alone toe welds is in particular advantageous in cases in which the multi-pass welded joint is welded from two sides. In those cases, both sides of the welds benefit from the presence of the stand-alone toe welds 41, 51, 81, 91.

In the embodiment of FIG. 17, a K-shaped weld seam is provided. A right first stand-alone toe weld 41 is provided on the welding area 11 of the first construction element 10 at a distance 42 from the position where the root area of the multi-pass weld that is to be created will be present. In addition, a left first stand-alone toe weld 81 is provided on the welding area 11 of the first construction element 10 at a distance 82 from the position where the root area of the multi-pass weld that is to be created will be present.

On the second construction element 20, a right second stand-alone toe weld 51 is provided on the welding area 21 of the second construction element 20 at a distance 52 from the position where the root area of the multi-pass weld that is to be created will be present. In addition, a left second stand-alone toe weld 91 is provided on the welding area 21 of the second construction element 20 at a distance 92 from the position where the root area of the multi-pass weld that is to be created will be present.

FIG. 18 shows a subsequent stage in the embodiment of FIG. 17.

Starting from the situation shown in FIG. 18, now a right root pass 43 and a left root pass 83 are applied at the root area of the welded joint to be created. The root passes 43, 83 are the first permanent weld connections between the first construction element 10 and the second construction element 20. The root passes 43, 83 are the first part of the multi-pass welded joint that actually connects the first construction element 10 and the second construction element 20 structurally with each other.

In general, the right root pass 43 will be made from the right side of the welding seam and the left root pass 83 will be made from the left side of the welding seam.

In a variant to the embodiment shown in FIG. 18, a single root pass may be applied.

Optionally, the making of the root pass or root passes is preceded by the application of one or more tack welds, but these dissolve in the actual root pass when the root pass is made or are ground out before the root pass is made. So, the tack welds do not structurally and sustained connect the first construction element 10 and the second construction element 20 with each other. The root passes 43, 83 each comprise one or more root pass beads.

FIG. 19 shows a further subsequent stage in the embodiment shown in FIG. 17.

Starting from the situation shown in FIG. 18, now a plurality of filling beads 44 is applied. Together with the optional stand-alone base weld, the first stand-alone toe welds 41, 81, the second stand-alone toe welds 51, 91 and the root passes 43, 83, the filling beads 44 form part of the multi-pass welded joint 1 between the first construction element 10 and the second construction element 20.

The filling beads 44 do not extend beyond the first stand-alone toe weld 41 on the surface of the first construction element 10 and also not beyond the second stand-alone toe weld 51 on the surface of the second construction element 20.

The invention claimed is:

1. An electric arc welding method for creating a multi-pass welded joint between a first metal construction element and a second metal construction element, wherein the method comprises:
    providing a first metal construction element that has a welding area, and applying a first stand-alone toe weld on said first construction element, wherein the first stand-alone toe weld comprises at least one first toe weld bead,
    providing a second metal construction element that has a welding area,
    after applying the first stand-alone toe weld on the first construction element, arranging the first construction element and the second construction element relative to each other in a joining position, in which joining position a distance is present seen along the welding area of the first construction element, between the first stand-alone toe weld and a root area of the welded joint to be created,
    while maintaining the joining position, making a first weld connection between the welding area of the first construction element and the welding area of the second construction element by applying a root pass at the root area of the welded joint to be created, wherein the root pass comprises at least one root pass bead,
    after applying the root pass, applying one or more filling beads, wherein the first stand-alone toe weld, the root pass, and the one or more filling beads together form part of the welded joint between the first construction element and the second construction element, wherein the first stand-alone toe weld forms a toe of said welded joint at a side of the first construction element and wherein at least some of the one or more filling beads are arranged between the root pass and the first stand-alone toe weld.

2. The welding method according to claim 1,
    wherein before arranging the first construction element and the second construction element relative to each other in the joining position, a second stand-alone toe weld is applied to the second construction element, wherein the second stand-alone toe weld comprises at least one second toe weld bead,
    wherein when in the joining position, a distance is present seen along the welding area of the second construction element, between the second stand-alone toe weld and the root area of the welded joint to be created,
    wherein the first stand-alone toe weld, the second stand-alone toe weld, the root pass and the one or more filling beads together form part of the welded joint between the first construction element and the second construction element, and wherein the second stand-alone toe weld forms a toe of said welded joint at a side of the second construction element.

3. The welding method according to claim 2,
    wherein the first stand-alone toe weld and/or the second stand-alone toe weld is applied in a downhand position, with a welding torch above the weld.

4. The welding method according to claim 2,
    wherein the first stand-alone toe weld and/or the second stand-alone toe weld is applied by an automated welding process.

5. The welding method according to claim 2,
    wherein the first construction element and/or second construction element is a cylindrical construction element having a longitudinal axis, and wherein the cylindrical construction element is rotated about said longitudinal axis during the application of the first stand-alone toe weld and/or the second stand-alone toe weld, respectively.

6. The welding method according to claim 2,
    wherein the first stand-alone toe weld comprises multiple first toe weld beads, and/or
    wherein the second stand-alone toe weld comprises multiple second toe weld beads.

7. The welding method according to claim 2,
    wherein a first stand-alone toe weld bead and/or a second stand-alone toe weld bead is applied by a welding process that has a heat input of less than 2.5 kJ/mm.

8. The welding method according to claim 2,
    wherein the welding area of the first construction element and/or the welding area of the second construction element is treated by a grinding process prior to the application of the root pass.

9. The welding method according to claim 8,
    wherein the welding area of the first construction element and/or the welding area of the second construction element is treated by a grinding process after the application of the first stand-alone toe weld and/or the second stand-alone toe weld, respectively.

10. The welding method according to claim 2, wherein the first stand-alone toe weld and/or the second stand-alone toe weld is subjected to a treatment aimed at improving a geometry and/or residual stress state of and/or near the first stand-alone toe weld and/or the second stand-alone toe weld, respectively, the treatment comprising shot peening, hammering, thermal treatment, or grinding, either before or after the root pass is applied.

11. The welding method according to claim 2, wherein the first stand-alone toe weld has a height relative to the welding area of the first construction element, which height is between 5% and 25% of a local wall thickness of the first construction element in a vicinity of the first stand-alone toe weld, and/or wherein the second stand-alone toe weld has a height relative to the welding area of the second construction element, which height is between 5% and 25% of a local wall thickness of the second construction element in a vicinity of the second stand-alone toe weld.

12. The welding method according to claim 1, wherein a distance between the first stand-alone toe weld and the root area of the welded joint, measured from the root area of the weld to be created to a center of the first stand-alone toe weld is between 1 and 2.5 times a local wall thickness of the second construction element in a vicinity of the welded joint.

13. An electric arc welding method for creating a multi-pass fillet welded joint between a first metal cylindrical construction element and a second metal cylindrical construction element, wherein the first construction element and second construction element are to be connected to each other in a joining position, in which joining position the first construction element and the second construction element extend at an angle relative to each other, wherein the welding method comprises:
providing a first metal cylindrical construction element that has a longitudinal axis, an outer wall, and on said outer wall a welding area, and applying a first stand-alone toe weld on the outer wall of said first construction element, wherein the first stand-alone toe weld comprises at least one first toe weld bead, wherein the first stand-alone toe weld has a shape of a projected image of a circle having a circle diameter, wherein the image is projected on the outer wall of the first construction element at an angle that is the same as a relative angle between the first construction element and the second construction element in the joining position,
providing a second metal cylindrical construction element that has a longitudinal axis, an outer wall and a welding area, wherein the second construction element has an outer diameter that is smaller than said circle diameter,
after applying the first stand-alone toe weld on the first construction element, arranging the first construction element and the second construction element relative to each other in said joining position wherein the first construction element and the second construction element are at an angle relative to each another, wherein in the joining position a distance is present seen along the welding area of the first construction element, between the first stand-alone toe weld and a root area of the welded joint to be created,
and wherein in the joining position the second construction element is arranged within a perimeter of the first stand-alone toe weld,
while maintaining the joining position, making a first weld connection between the welding area of the first construction element and the welding area of the second construction element by applying a root pass at the root area of the welded joint to be created, wherein the root pass comprises at least one root pass bead,
after applying the root pass, applying one or more filling beads, wherein the first stand-alone toe weld, the root pass, and the one or more filling beads together form part of the welded joint between the first construction element and the second construction element, wherein the first stand-alone toe weld forms a toe of said welded joint at a side of the first construction element and wherein at least some of the one or more filling beads are arranged between the root pass and the first stand-alone toe weld.

14. The welding method according to claim 13, wherein the first stand-alone toe weld is applied in a downhand position, with a welding torch above the weld, and wherein the first construction element is rotated around its longitudinal axis during the application of the first stand-alone toe weld.

15. The welding method according to claim 13, wherein before arranging the first construction element and the second construction element relative to each other in the joining position, a second stand-alone toe weld is applied to the second construction element, wherein the second stand-alone toe weld comprises at least one second toe weld bead,
wherein when in the joining position, a distance is present seen along the welding area of the second construction element, between the second stand-alone toe weld and the root area of the welded joint to be created,
wherein the first stand-alone toe weld, the second stand-alone toe weld, the root pass and the one or more filling beads together form part of the welded joint between the first construction element and the second construction element, and wherein the second stand-alone toe weld forms a toe of said welded joint at a side of the second construction element.

16. The welding method according to claim 13, wherein the first construction element is provided at a first production site, wherein the first stand-alone toe weld is applied on the first construction element at said first production site, and wherein the root pass is made at a second production site that is different from the first production site, wherein the method further comprises transporting the first construction element with the first stand-alone toe weld thereon from the first production site to the second production site.

* * * * *